US012776731B2

(12) United States Patent
Khalid et al.

(10) Patent No.: US 12,776,731 B2
(45) Date of Patent: Oct. 27, 2026

(54) METHOD AND SYSTEM FOR CONTROLLING HYBRID ELECTRIC VEHICLES

(71) Applicant: KING FAHD UNIVERSITY OF PETROLEUM AND MINERALS, Dhahran (SA)

(72) Inventors: Muhammad Khalid, Dhahran (SA); Kamran Zeb, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/065,378

(22) Filed: Feb. 27, 2025

(65) Prior Publication Data

US 2026/0254381 A1 Aug. 27, 2026

(51) Int. Cl.

| | |
|---|---|
| ***H02P 21/05*** | (2006.01) |
| ***B60W 10/08*** | (2006.01) |
| ***B60W 20/13*** | (2016.01) |
| ***B60W 30/18*** | (2012.01) |
| ***H02P 21/00*** | (2016.01) |
| ***H02P 27/12*** | (2006.01) |

(52) U.S. Cl.

CPC ............ *H02P 21/05* (2013.01); *B60W 10/08* (2013.01); *B60W 20/13* (2016.01);
(Continued)

(58) Field of Classification Search

CPC ...... H02P 21/05; H02P 21/0007; H02P 27/12; H02P 2207/01; B60W 20/13;
(Continued)

(56) References Cited

U.S. PATENT DOCUMENTS 7,339,394 B2 * 3/2008 De Larminat .......... H02P 7/282 324/545
9,597,979 B1 * 3/2017 Hao .......................... B60L 7/14
(Continued)

FOREIGN PATENT DOCUMENTS

CN 108583311 A 9/2018

OTHER PUBLICATIONS

Faiqa Noor, et al., "Design and validation of adaptive barrier function sliding mode controller for a novel multisource hybrid energy storage system based electric vehicle", IEEE Access, vol. 12, Oct. 1, 2024, pp. 145270-145285 (16 pages).
(Continued)

*Primary Examiner* — Gertrude Arthur Jeanglaude
(74) *Attorney, Agent, or Firm* — Oblon, McClelland, Maier & Neustadt, L.L.P.

(57) ABSTRACT

A method and a control system for controlling a hybrid electric vehicle (HEV). The method includes regulating power distribution in a hybrid energy storage system (HESS) having multiple energy sources, including a fuel cell, a battery, a supercapacitor, and a photovoltaic panel. The method includes controlling an induction motor connected to the DC bus through an inverter by applying a space vector pulse width modulation (SVPWM) technique to generate a desired alternative current (AC) output. The method includes maintaining a desired speed and torque of the induction motor by independently modulating d-axis and q-axis current components of a stator of the induction motor. The method includes implementing a barrier function adaptive sliding mode controller (BFASMC) to adjust controller gain values in real-time in response to varying load conditions, mitigate control chattering, and adaptively manage energy flow within the HESS based on load conditions and regenerative braking scenarios.

20 Claims, 11 Drawing Sheets

(52) U.S. Cl.
CPC ... *B60W 30/18127* (2013.01); *H02P 21/0007* (2013.01); *H02P 27/12* (2013.01); *B60W 2510/244* (2013.01); *B60W 2510/28* (2013.01); *B60W 2710/081* (2013.01); *B60W 2710/083* (2013.01); *H02P 2207/01* (2013.01)

(58) Field of Classification Search
CPC ........... B60W 10/08; B60W 30/18127; B60W 2510/244; B60W 2510/28; B60W 2710/081; B60W 2710/083
See application file for complete search history.

(56) References Cited

U.S. PATENT DOCUMENTS 12,074,546 B2 * 8/2024 Pennington, III ........ H02P 6/08
12,231,083 B2 * 2/2025 Ginsberg-Klemmt ........................ H02S 20/23
12,418,191 B2 * 9/2025 Wu .......................... B60L 50/40
2009/0309416 A1 * 12/2009 Bose ..................... B60W 10/26 307/9.1
2023/0047077 A1 * 2/2023 Abianeh ................. H02J 3/381
2024/0313654 A1 9/2024 Giri et al.
2024/0347818 A1 * 10/2024 Khalid .................... B60L 50/40
2024/0405709 A1 * 12/2024 Pennington, III ...... H02P 23/14

OTHER PUBLICATIONS

Muhammad Muzammal Islam, et al., "Adaptive nonlinear control of unified model of fuel cell, battery, ultracapacitor and induction motor based hybrid electric vehicles", IEEE Access, vol. 09, Apr. 12, 2021, pp. 57486-57509 (24 pages).

* cited by examiner

900

METHOD AND SYSTEM FOR CONTROLLING HYBRID ELECTRIC VEHICLES

STATEMENT OF ACKNOWLEDGEMENT

The support provided by the Deanship of Scientific Research (DSR) at King Fahd University of Petroleum & Minerals (KFUPM), Dhahran, Saudi Arabia, is gratefully acknowledged.

BACKGROUND

Technical Field

The present disclosure is directed to electrical vehicles, and more particularly to a method and a system for controlling hybrid electrical vehicles (HEVs).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The depletion of conventional energy resources, particularly fossil fuels, and emerging environmental challenges such as accelerated ozone layer depletion have become important global concerns. The significant increase in fuel consumption is a primary driver behind the deterioration of atmospheric conditions, highlighting the need for alternative, sustainable energy sources. In response, the global community has increasingly prioritized the transition to environmentally friendly energy solutions, escalating advancements in power transmission and energy storage systems, especially in the transportation sector.

The transport industry, historically reliant on conventional internal combustion engine (ICE) vehicles, has contributed significantly to global environmental issues, including emissions, air pollution, and reliance on petroleum. As a solution, hybrid electric vehicles (HEVs) and electric vehicles (EVs) have gained traction as viable alternatives. EVs, in particular, offer a reduction in petroleum consumption, zero emissions, environmental adaptability, and quieter operation. Despite these advantages, EVs still face significant challenges, particularly in the areas of cost reduction, durability improvement, and enhanced performance.

Key to the performance and efficiency of the HEVs and the EVs is the development of energy storage devices (ESDs) with high energy and power densities. Energy storage devices with high power density are crucial for enabling rapid charge and discharge cycles, whereas high energy density contributes to extended travel range. Further, supercapacitors (SCs) exhibit excellent power density and extended lifespans but suffer from relatively lower energy density and higher energy costs. Conversely, batteries, while providing higher energy density, face challenges in terms of lower power density and shorter lifespans. As a result, research in hybrid energy storage systems (HESSs) has focused on integrating both types of devices to combine the strengths of each while mitigating their respective weaknesses.

The integration of the HESSs in the HEVs and the EVs is a complex task due to the dynamic nature of the vehicular environment. Rapid acceleration and deceleration introduce significant variations in load torque and speed of an HEV or an EV, creating unpredictable operating conditions. These dynamic fluctuations can lead to non-linear behaviors within the HESSs, affecting the performance of various components of these vehicles (i.e., the HEVs and the EVs), including energy sources, power converters, and traction motors. Consequently, the control of the HEVs becomes highly intricate, particularly in managing the interaction between the energy storage devices and the electric motor.

Further, an alternative current (AC) asynchronous motor, also known as an induction motor (IM), is widely utilized in these vehicle applications due to its robustness and ability to operate without direct mechanical connection between the stationary and rotating parts. The efficient control of the IM is critical to the overall performance of these vehicles, and one effective method of control is Indirect Vector Control (IVC). The IVC relies on key motor parameters such as rotor resistance ($R_r$), mutual inductance ($L_m$), and self-inductance of a rotor ($L_r$). These key motor parameters are sensitive to changes in temperature and machine saturation, and any mismatch or fluctuation can significantly impact motor performance, leading to steady-state errors and degraded transient behavior. To maintain optimal motor performance, regular adjustment of the controller parameters is essential.

The current challenges in the design and optimization of the HESSs for these vehicles are compounded by the non-linear dynamics and unpredictable variations in torque and speed.

Consequently, there remains a need for innovative approaches that can enhance the integration of the HESSs with motor speed tracking, ensuring improved performance, efficiency, and durability of these vehicles under dynamic operating conditions.

Accordingly, it is one object of the present disclosure to provide a method and a system for controlling HEVs.

SUMMARY

In an exemplary embodiment, a control system for a hybrid electric vehicle (HEV) is described. The control system includes a hybrid energy storage system (HESS) having multiple energy sources. In some embodiments, the HESS includes a fuel cell, a battery, a supercapacitor, and a photovoltaic panel. Each energy source is connected to a direct current (DC) bus through DC-DC converters. The control system includes an induction motor operatively connected to the DC bus through an inverter configured to generate a desired alternative current (AC) output for induction motor control. The inverter is controlled by a space vector pulse width modulation (SVPWM) technique. The control system includes a barrier function-based adaptive sliding mode controller (BFASMC) configured to regulate power distribution among the multiple energy sources of the HESS by dynamically adjusting duty cycles of the DC-DC converters to achieve voltage stability at the DC bus. The BFASMC is further configured to maintain a desired speed and torque of the induction motor by controlling induction motor current components in a decoupled vector control framework. The BFASMC modulates d-axis and q-axis current components of a stator of the induction motor. The BFASMC is further configured to adaptively adjust controller gain values in response to real-time load variations of the HEV to reduce control chattering and increase control precision.

In another exemplary embodiment, a control system for an HEV is described. The control system includes an HESS having multiple energy sources including a fuel cell, a battery, a supercapacitor, and a photovoltaic panel. Each energy source is connected to a DC bus through DC-DC converters. The DC bus is configured to regulate and distribute power to an induction motor and auxiliary systems of the HEV. The control system includes an inverter and the induction motor. The inverter is configured to convert DC power from the DC bus to an AC power for driving the induction motor. The control system includes a controller configured to implement a BFASMC algorithm. The controller is operatively connected to the DC-DC converters, the inverter, and the induction motor. The controller is further configured to regulate power distribution among the multiple energy sources of the HESS by dynamically adjusting duty cycles of the DC-DC converters to achieve voltage stability at the DC bus. The controller is further configured to maintain a desired speed and torque of the induction motor by controlling induction motor current components in a decoupled vector control framework, wherein the controller modulates d-axis and q-axis current components of a stator of the induction motor. The controller is further configured to adaptively adjust controller gain values in response to real-time load variations of the HEV to reduce control chattering and increase control precision. The controller is further configured to regulate DC bus voltage and motor speed using a control law derived from a Lyapunov stability criterion to ensure global asymptotic stability of the HEV.

In yet another exemplary embodiment, a method for controlling an HEV is described. The method includes regulating power distribution in an HESS having multiple energy sources, including a fuel cell, a battery, a supercapacitor, and a photovoltaic panel, by dynamically adjusting duty cycles of associated DC-DC converters to stabilize voltage at a DC bus. The method includes controlling an induction motor connected to the DC bus through an inverter by applying a space vector pulse width modulation (SVPWM) technique to generate a desired AC output. The method includes maintaining desired speed and torque of the induction motor by independently modulating d-axis and q-axis current components of a stator of the induction motor using a decoupled vector control framework. The method includes implementing a BFASMC to adjust controller gain values in real-time in response to varying load conditions, mitigate control chattering, and adaptively manage energy flow within the HESS based on load conditions and regenerative braking scenarios.

In yet another exemplary embodiment, a non-transitory computer-readable medium having instructions stored therein that, when executed by one or more processors, cause the one or more processors to perform a method for controlling an HEV is described. The method includes regulating power distribution in an HESS having multiple energy sources, including a fuel cell, a battery, a supercapacitor, and a photovoltaic panel, by dynamically adjusting duty cycles of associated DC-DC converters to stabilize voltage at a DC bus. The method includes controlling an induction motor connected to the DC bus through an inverter by applying an SVPWM technique to generate a desired AC output. The method includes maintaining desired speed and torque of the induction motor by independently modulating d-axis and q-axis current components of a stator of the induction motor using a decoupled vector control framework. The method includes implementing a BFASMC to adjust controller gain values in real-time in response to varying load conditions, mitigate control chattering, and adaptively manage energy flow within the HESS based on load conditions and regenerative braking scenarios.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
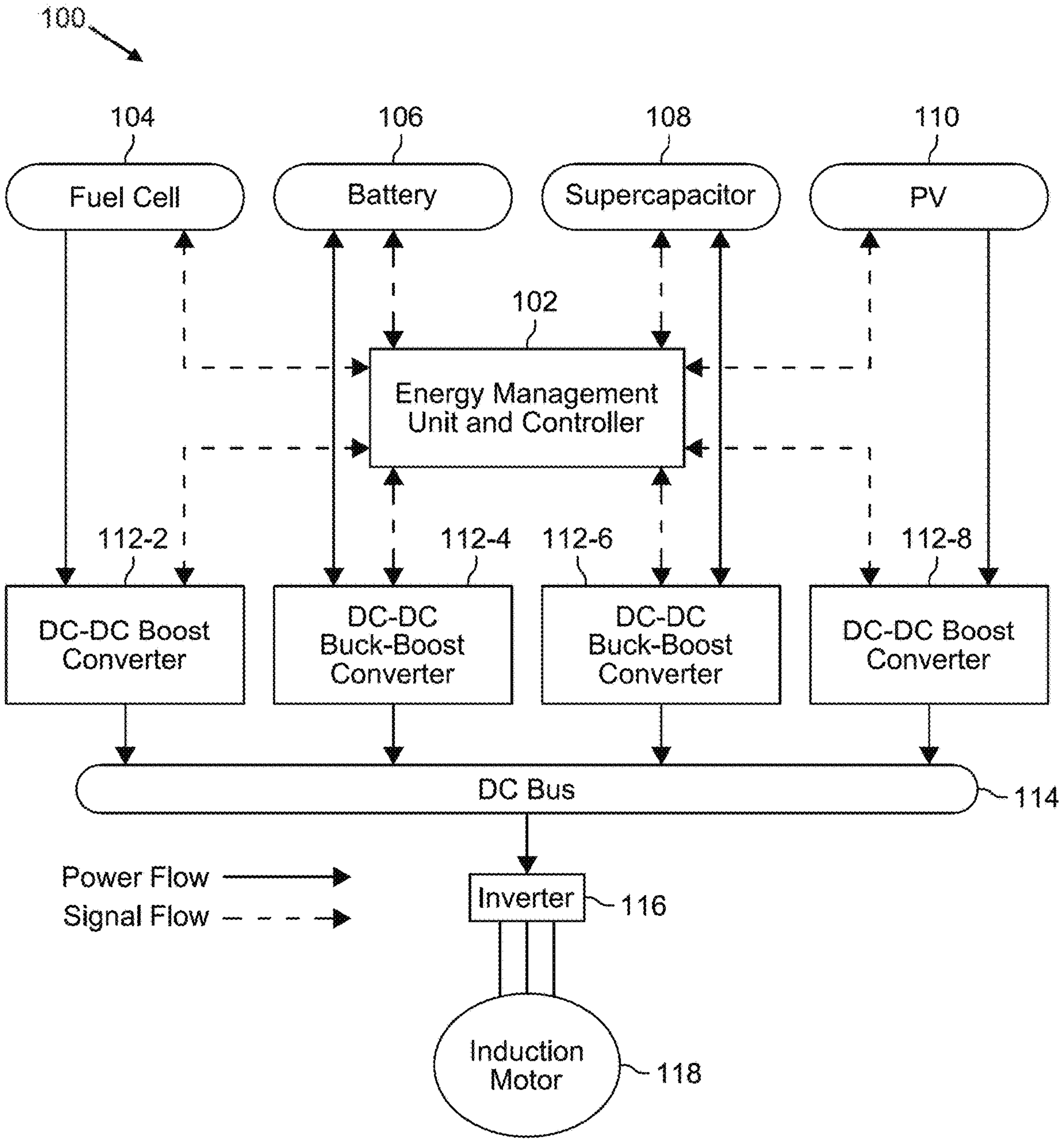
FIG. 1 is an exemplary diagram of a control system for a hybrid electric vehicle (HEV), according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a control system and a method for controlling a hybrid electric vehicle (HEV) is described. The method includes regulating power distribution in a hybrid energy storage system (HESS) having multiple energy sources, including a fuel cell, a battery, a supercapacitor, and a photovoltaic panel, by dynamically adjusting duty cycles of associated direct current (DC)—DC converters to stabilize voltage at a DC bus. The method includes controlling an induction motor connected to the DC bus through an inverter by applying a space vector pulse width modulation (SVPWM) technique to generate a desired alternative current (AC) output. The method includes maintaining desired speed and torque of the induction motor by independently modulating d-axis and q-axis current components of a stator of the induction motor using a decoupled vector control framework. The method includes implementing a barrier function-based adaptive sliding mode controller (BFASMC) to adjust controller gain values in real-time in response to varying load conditions, mitigate control chattering, and adaptively manage energy flow within the HESS based on load conditions and regenerative braking scenarios.

Referring now to FIG. 1, the present disclosure provides a diagram of a control system 100 for an HEV, according to certain embodiments. The control system 100 is configured to control the HEV. The HEV is a vehicle that uses both an internal combustion engine (ICE) and an electric motor to drive the vehicle, aiming to improve fuel efficiency and reduce emissions. The HEV stores energy in batteries, which are charged through regenerative braking and by the ICE, without a need to plug the HEV into an external power source. As depicted in the FIG. 1, the control system 100 includes an HESS and a controller depicted as an energy management unit and controller 102.

In an embodiment, the controller 102 may be a BFASMC. Further, the HESS includes multiple energy sources, such as, a fuel cell 104, a battery 106, a supercapacitor 108, and a photovoltaic panel 110, depicted as a PV.

As depicted in the FIG. 1, each energy source is connected to a DC bus 114 via an associated DC-DC converter. The associated DC-DC converter may correspond to a DC-DC boost converter 112-2, a DC-DC buck-boost converter 112-4, a DC-DC buck-boost converter 112-6, and a DC-DC boost converter 112-8. In an embodiment, the DC-DC boost converter 112-2, the DC-DC buck-boost converter 112-4, the DC-DC buck-boost converter 112-6, and the DC-DC boost converter 112-8 are collectively referred to as DC-DC converters 112. For example, the fuel cell 104 is connected to the DC bus 114 via the DC-DC boost converter 112-2. Similarly, the battery 106, the supercapacitor 108, and the PV 110 is connected to the DC bus 114 via the DC-DC buck-boost converter 112-4, the DC-DC buck-boost converter 112-6, and the DC-DC boost converter 112-8, respectively. In an embodiment, a DC-DC boost converter (e.g., the DC-DC boost converter 112-2 or the DC-DC boost converter 112-8) is a power converter that is used to increase an input voltage to a higher output voltage, maintaining the same polarity. The DC-DC boost converter is used when the input voltage needs to be boosted to a higher value, such as when powering devices requiring a higher voltage from a lower voltage source. Further, a DC-DC buck-boost converter (e.g., the DC-DC buck-boost converter 112-4 and the DC-DC buck-boost converter 112-6) is a versatile power converter that is used to increase or decrease an input voltage, providing a desired output voltage regardless of whether the input voltage is higher or lower than the desired output voltage. In other words, the HESS includes (a) a boost converter, i.e., the DC-DC boost converter (e.g., the DC-DC boost converter 112-2 or the DC-DC boost converter 112-8) for the fuel cell 104 and the photovoltaic panel 110 to step up voltage of the fuel cell and the photovoltaic panel to match DC bus voltage, and (b) bidirectional buck-boost converters, i.e., the DC-DC buck-boost converter (e.g., the DC-DC buck-boost converter 112-4 and the DC-DC buck-boost converter 112-6) for the battery 106 and the supercapacitor 108 to enable both charging and discharging operations. Further, as depicted in the FIG. 1, an induction motor 118 is operatively connected to the DC bus 114 through an inverter 116. The induction motor 118 is configured to generate a desired alternative current (AC) output for induction motor control.

In an embodiment, as depicted via the FIG. 1, the HESS integrates the fuel cell 104, the battery 106, the supercapacitor 108, and the photovoltaic panel 110 as energy sources. The fuel cell 104 is a non-rechargeable energy source, while the battery 106 and the supercapacitor 108 are a rechargeable energy source. Further, the PV panel 110 provides a cost-free energy source. The HESS supplies a DC voltage to the DC bus 114 through the DC-DC converters 112, which regulate a desired speed and torque of the induction motor 118. To achieve the desired speed and torque, the voltage of the DC bus 114 is first converted to the AC output using the inverter 116. The DC-DC converters 112 are employed with the energy sources to adjust their voltage levels, stepping up or stepping down the voltage to provide the desired voltage at the DC bus 114. In an embodiment, the HESS exhibits a high energy density, a large storage capacity, and a long lifespan.

In an embodiment, the fuel cell 104 is a clean energy source known for a high efficiency. The fuel cell 104 generates energy through a chemical reaction between hydrogen and oxygen, facilitated by an electrolyte. The electrolyte is a substance that conducts electricity when dissolved in water or melted, due to the presence of free ions. The fuel cell 104 is connected to the DC bus 114 via the DC-DC boost converter 112-2, which steps-up the voltage of the fuel cell 104. The DC-DC boost converter 112-2 converter utilizes a high-frequency inductor ($L_1$) with an internal resistance ($R_1$), a single insulated gate bipolar transistor (IGBT), and a filtering capacitor (C). Further, to overcome the limitations (e.g., a limited power output, a dependency on fuel availability, an efficiency degradation over time, a slow response to rapid load changes, etc.) of the fuel cell 104, auxiliary energy sources, such as the battery 106 and the supercapacitor 108 are integrated in conjunction with the fuel cell 104. This integration of the multiple energy sources enhances the driving range of the HEV and mitigates the load stress on each individual energy source. As a result, the lifespan of each energy source is increased.

The battery 106 is a rechargeable device that stores energy during deceleration and regenerative braking, providing power during constant load conditions. The battery 106 is connected to the DC-DC buck-boost converter 112-4. The DC-DC buck-boost converter 112-4 is configured to adjust the voltage of the battery 106 to match the voltage level of the DC bus 114 by either stepping up (i.e., increasing) or stepping down (i.e., decreasing) the voltage of the battery 106. The DC-DC buck-boost converter 112-4 consists of several components, including a resistor $R_2$, an inductor $L_2$, two IGBT switches $S_2$ and $S_3$, and two diodes $D_2$ and $D_3$.

Further, the supercapacitor 108 is a high-capacitance capacitor that is well-suited for use in the HEV due to its high-power density, compact size, fast charging capabilities, and ability to efficiently capture regenerative energy. The supercapacitor 108 offers a significantly longer lifespan compared to batteries, with an ability to endure approximately one million recharge cycles. For power regulation of the supercapacitor 108, the DC-DC buck-boost converter 112-6 (e.g., a bidirectional DC-DC buck-boost converter) is employed with the supercapacitor 108, consisting of a resistor $R_3$, an inductor $L_3$, two IGBTs with switches $S_4$ and $S_5$, and two diodes $D_4$ and $D_5$.

Further, one or more PV panels (e.g., the PV panel 110) are arranged in strings. In some embodiments, each string consists of 15 PV panels and each PV panel produces 65 Watt (W) of power. The PV panels may be configured to collectively generate 1.35 kilowatts (kW) of power.

In an embodiment, the energy output of the one or more PV panels is influenced by temperature and solar radiation levels. As a cost-free and environmentally sustainable energy source, the PV panel 110 is connected to the DC-DC boost converter 112-4, which steps up the voltage of the PV panel 110 to match the voltage of the DC bus. The DC-DC boost converter 112-4 includes components such as a resistor $R_4$, an inductor $L_4$, a capacitor $C_2$, an IGBT switch $S_6$, and a diode $D_6$.

Initially, a Space Vector Pulse Width Modulation (SVPWM) was developed as a vector-based alternative to a traditional Pulse Width Modulation (PWM) for three-phase inverters. In current embodiment, switching states of the inverter 116 are represented by space vectors. The three-phase quantities are transformed into their equivalent two-phase components, either in a stationary frame or a synchronously rotating frame. Further, a magnitude of a reference vector is then determined from the two-phase components, which is used to modulate an output of the inverter 116.

Further, the induction motor 118 is used due to its robustness, cost-effectiveness, long lifespan, easy availability, and wide speed range. In an embodiment, the induction motor 118 is preferred over other motor types in a performance-oriented HEV due to these characteristics as the induction motor 118 is well-suited for demanding applications where durability and versatility are essential. This is because challenging driving conditions require a motor capable of performing efficiently under varying load demands. Therefore, a selection of an appropriate motor is critical for optimizing an overall performance of the HEV, as the motor directly influences key factors such as acceleration, torque, and efficiency. Apart from the induction motors, several other types of electric motors are known for their rapid acceleration and high torque output. Several types of electric motors are commercially available, including DC motors, induction motors, brushless permanent magnet motors (BLPMs), and switched reluctance motors (SRMs) which are known for their rapid acceleration and high torque output. In an embodiment, the induction motor 118 is controlled via an indirect vector control (IVC) that uses feedback from stator current measurements to regulate the d-axis and q-axis current components. In an embodiment, the q-axis current component is controlled for torque and the d-axis current component for magnetic flux, achieving decoupled control under dynamic driving conditions.

In an embodiment, the BFASMC is configured to regulate power distribution among the multiple energy sources (i.e., the fuel cell 104, the battery 106, the supercapacitor 108, and the photovoltaic panel 110) of the HESS by dynamically adjusting duty cycles of the DC-DC converters 112 to achieve voltage stability at the DC bus 114. Further, the BFASMC is configured to maintain the desired speed and the torque of the induction motor 118 by controlling induction motor current components in a decoupled vector control framework. In an embodiment, the BFASMC modulates d-axis (i.e., a direct axis) and q-axis (i.e., a quadrature axis) current components of a stator of the induction motor 118. The stator is a stationary part of the induction motor 118 that generates a rotating magnetic field when supplied with the AC. In an embodiment, the d-axis current component is aligned with a rotor's magnetic field, which is responsible for producing a magnetic flux that drives the rotation of the induction motor 118. Further, the q-axis current component is perpendicular to the d-axis current component and is responsible for generating the torque. By modulating the d-axis and q-axis current components, the BFASMC can fine-tune the performance of the induction motor 118 for different load conditions, ensuring stability and efficiency. Further, the BFASMC is configured to adjust controller gain values in response to real-time load variations of the HEV to reduce control chattering and increase control precision. For example, if the load on increases in the induction motor 118, the BFASMC might increase q-axis current to generate more torque while adjusting d-axis current to maintain a constant magnetic flux. In an embodiment, the chattering refers to rapid, oscillatory behavior or instability in the control system 100. Further, the precision refers to an ability of the control system 100 to make accurate adjustments to the performance (such as the torque and the magnetic flux) of the induction motor 118 ensuring stable and fine-tuned operation without over-corrections or oscillations.

In an embodiment, the BFASMC is configured to adaptively manage energy flow within the HESS by directing energy from the fuel cell 104 and the battery 106 during high-load condition, enabling energy recovery in the supercapacitor 108 and the battery 106 during regenerative braking, and using photovoltaic power to charge the battery and the supercapacitor under low-load conditions. The BFASMC is configured to employ a Lyapunov stability criterion to ensure global asymptotic stability of the control system 100 under varying load conditions, achieving finite-time convergence of system states to a predefined sliding surface.

In addition, the BFASMC is configured to continuously adjust the controller gain values based on variations in HEV load and energy source parameters to control both the HESS and the induction motor 118. The BFASMC is also configured to define sliding surfaces for error variables corresponding to current of each energy source in the HESS, the DC bus voltage, and the speed, torque, and flux (also referred to as the magnetic flux) of the induction motor 118.

The BFASMC offers several advantageous features that improve the control system's performance and robustness under varying conditions. These advantages include, a finite-time convergence of an output variable to a predefined neighborhood of zero, independent of bounded disturbances, the BFASMC capability to function without the need for a low-pass filter or explicit disturbance bounds, and a barrier function's ability to determine an appropriate gain to converge the output variable without overestimation, solely aimed at achieving convergence to the predefined neighborhood of zero.

The BFASMC, as an advanced extension of a traditional Sliding Mode Controller (SMC), is designed to control systems subject to uncertainties, disturbances, and operational constraints. The core feature of BFASMC is incorporation of the barrier function, which ensures that the state of the control system 100 remains within predefined boundaries, thereby preventing violations of safety and operational limits. The BFASMC continuously adapts in real time to address changes in disturbances and uncertainties, ensuring stability and optimal performance. Furthermore, the BFASMC mitigates the chattering effect typically associated with the traditional SMC by utilizing smoother control signals, improving overall efficiency and precision of the control system 100. To implement the BFASMC, initially, the control system's governing equations, constraints, and desired trajectory, represented by the predefined sliding surface are defined. Further, the control system's current state is measured and compares with predefined constraints and a desired trajectory (i.e., the predefined sliding surface) to evaluate performance. Furthermore, the proximity of the control system's state to constraints is determined and the barrier function is computer to enforce operational limits. Thereafter, control parameters are dynamically updated based on real-time observations of uncertainties and disturbances in the control system 100. Further, the necessary control input to guide the control system 100 toward the desired trajectory is determined while ensuring that the constraints are respected. Lastly, this process is reiterated continuously ensuring that the control system 100 adheres to constraints and follows the desired trajectory effectively.

In an embodiment, the disturbances in the control system 100 of the HEV refer to both external and internal factors that can disrupt normal operation of the HEV, causing uncertainties, variations, or deviations in the behavior of the control system. The BFASMC must address these disturbances to maintain stability and optimal performance. The external disturbances include environmental changes such as fluctuations in solar irradiation and temperature, which can affect the output of the photovoltaic panel 110. Load variations, such as sudden changes in load torque due to abrupt acceleration, deceleration, or additional auxiliary load demands (e.g., air conditioning), also contribute to disturbances. Furthermore, road conditions, including uneven surfaces or inclines, can influence the energy and torque requirements of the HEV. Further, the internal disturbances stem from system-specific factors such as parameter uncertainties, where changes in motor parameters or system parameters, such as rotor resistance, inductance, or capacitance may occur due to temperature fluctuations or saturation effects. Additionally, energy source characteristics, like variations in the output of the fuel cell 104 due to hydrogen consumption rates or changes in the behavior of the battery 106 under varying SoC conditions, introduce further disturbances. Finally, power conversion dynamics, including nonlinearities and switching delays in the DC-DC converters 112 or the inverter 116, can also impact the overall operation of the control system 100. This complete method of controlling the HEV using the control system 100 is further explained in detail in conjunction with FIG. 2 to FIG. 10.

Figure 2:
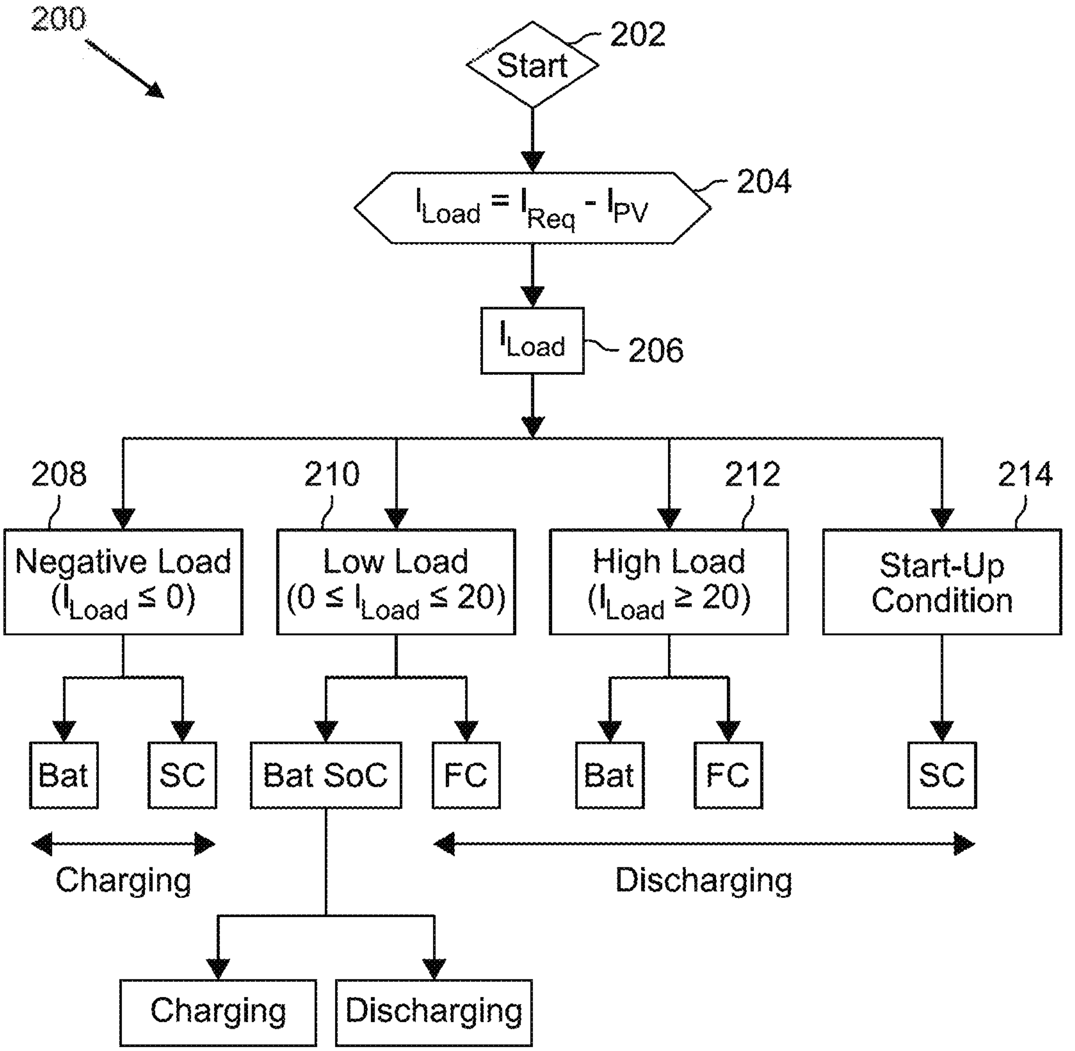
FIG. 2 is an exemplary diagram depicting an energy management method used in a HEV, according to certain embodiments.

Referring now to FIG. 2, the present disclosure provides a diagram 200 depicting an energy management strategy used in the HEV, according to certain embodiments. In an embodiment, four energy sources, i.e., the fuel cell 104, the battery 106, the supercapacitor 108, and the photovoltaic panel 110 are used within the control system 100 of the HEV. To optimize operational efficiency under varying load conditions, it is crucial to implement an effective energy management strategy that allocates power across these four energy sources based on their respective load demands. While photovoltaic energy is a renewable energy source, the power output of the photovoltaic energy is subject to external variables, such as temperature and solar irradiance, which can lead to insufficient energy generation to meet demand. Therefore, to ensure stable power balance, apart from the photovoltaic panel 110, the HESS incorporates the fuel cell 104, the battery 106, and the supercapacitor 108.

FIG. 2 illustrates the energy management strategy employed in the HEV. In FIG. 2, the fuel cell 104 is represented as FC, the battery 106 is represented as 'Bat', and the supercapacitor 108 is represented as SC. At step 202, a process to perform energy management in the HEV is initiated. Further, at step 204, a current (depicted as $I_{load}$) required by the load or based on the demand from the control system 100 is determined based on a difference between a total current ($I_{req}$) required by the control system 100 to meet the load's power demand of the control system 100 and a current provided by the photovoltaic panel 110 ($I_{PV}$). Upon determining the current ($I_{load}$) required by the load, the energy management approach is performed. For example, in one embodiment, if the photovoltaic panel 110 generates enough current ($I_{PV}$) to meet the total required current ($I_{req}$), the load current ($I_{load}$) can be reduced, and the excess current can be stored in the battery 106 or used elsewhere. In another embodiment, if the photovoltaic panel 110 generates less current ($I_{PV}$) than the total required current ($I_{req}$), then the remaining load current, i.e., the load current ($I_{load}$) will have to be supplied by other sources, such as the fuel cell 104 or the battery 106, to meet the demand of the control system 100. To balance the load current ($I_{load}$) as depicted via step 206, an energy management algorithm is used to coordinate the four energy sources.

For example, during a negative load condition depicted via step 208, such as during regenerative braking, both the supercapacitor 108 (depicted as SC) and the battery 106 (depicted as the Bat) enter charging mode. The fuel cell 104 (depicted as FC) does not operate during this period, as power is recovered through braking. The supercapacitor 108 and the battery 106 work together to store the recovered power depicted as charging. Further, during a low load condition, as depicted via step 210, the fuel cell 104 (depicted as FC) continuously supplies the power required to meet the demand depicted as discharging. Further, depending on the state of charge (SoC) of the battery 106 (depicted as the Bat SoC), the battery 106 either discharges to support the demand or charges to store the power for later use, which is depicted as discharging and charging. Further, during a high load condition, as depicted via a step 212, both the battery 106 and the fuel cell 104 work together to provide sufficient power to meet the demand, depicted as discharging. The fuel cell 104 primarily supports the load, while the battery 106 supplements the load if necessary. Further, during a start-up condition, as depicted via a step 214, due to an ability of the supercapacitor 108 (depicted as SC) to discharge rapidly, the supercapacitor 108 is used to provide a quick burst of the power for start-up conditions, ensuring the control system 100 of the HEV can meet peak power demands instantaneously. In an embodiment, during daytime operation, the power energy from the photovoltaic panel 110 can be used to charge both the battery 106 and the supercapacitor 110. This usage of the photovoltaic panel 110 allows for the effective utilization of renewable energy and reduces reliance on the fuel cell 104.

Figure 3:
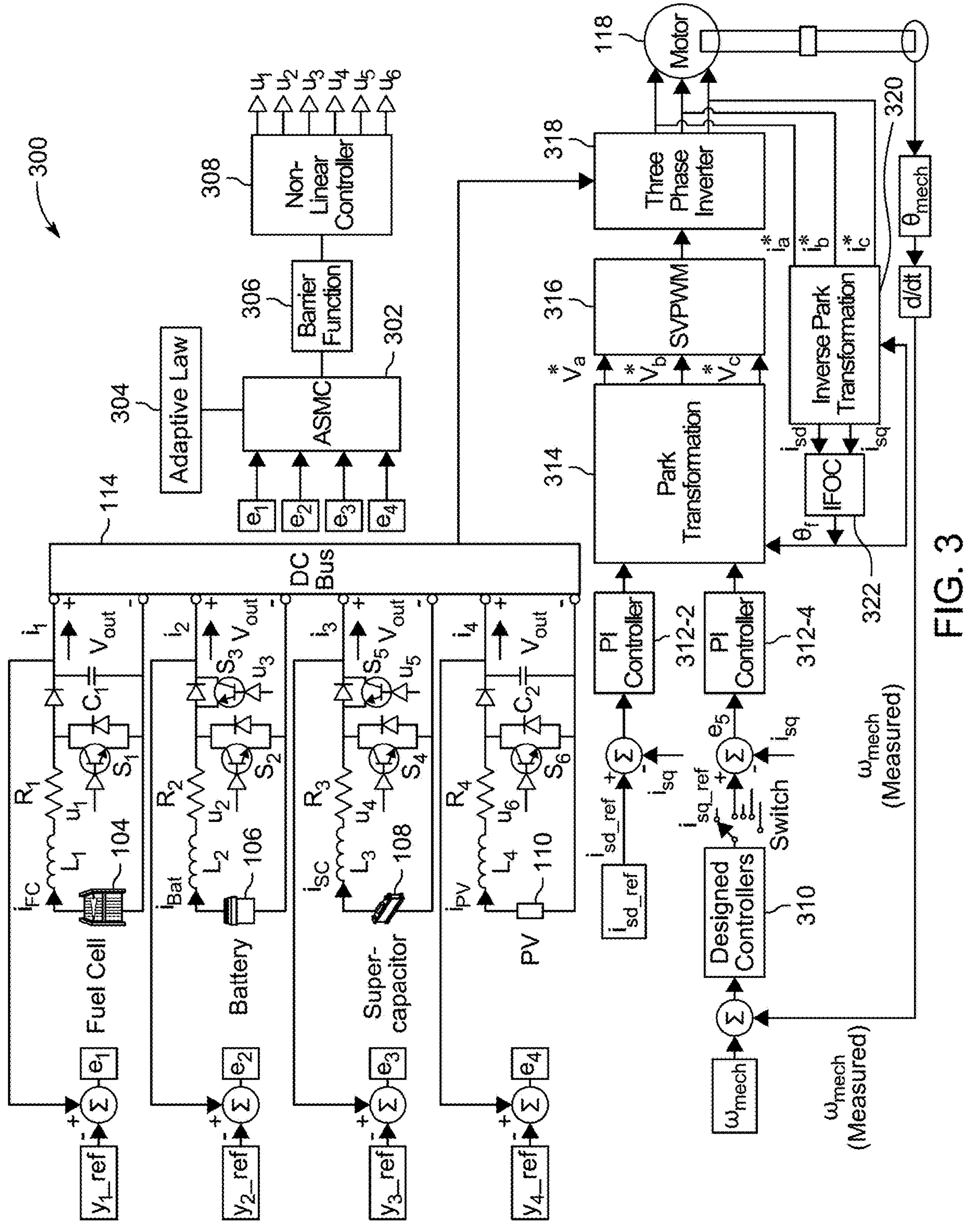
FIG. 3 is an exemplary diagram depicting a comprehensive schematic delineation of an Indirect Vector Control (IVC), according to certain embodiments.

Referring now to FIG. 3, the present disclosure provides a diagram 300 depicting a comprehensive schematic delineation of an Indirect Vector Control (IVC), according to certain embodiments. The diagram 300 represents a detailed and clear graphical representation that outlines the structure and functioning of the IVC. As depicted in FIG. 3, the diagram 300 includes all key components, interconnections, and control mechanisms that define how the IVC manages and coordinates various subsystems within the HEV, such as the multiple energy sources, i.e., the fuel cell 104, the battery 106, the supercapacitor 108, and the photovoltaic panel 110, power converters, and control units. Apart from the multiple energy sources, the diagram 300 includes the DC bus 114, the induction motor 118, an adaptive sliding mode controller (ASMC) 302 (i.e., the BFASMC), an adaptive law module 304 (also referred to as an adaptive gain module), a barrier function module 306, a non-linear controller 308, designed controller 310 (i.e., the energy management approach), Proportional-Integral (PI) controllers 312-2 and 312-4, a park transformation module 314, a SVPWM module 316, a three-phase inverter 318 (same as the inverter 116), an inverse park transformation module 320, an indirect field-oriented control (IFOC) 322.

The ASMC 302 corresponds to the BFASMC. The BFASMC is configured to regulate the operation of the induction motor 118 by adapting to dynamics of the control system 100 of the HEV, providing robust control under varying load and speed conditions while minimizing chattering. The barrier function module 306 is configured to dynamically modulate control signals as a state of the control system 100 approaches a predefined sliding surface, reducing chattering effects in the control signals. The predefined sliding surface includes a positive definite barrier function (PBF) and a positive semi-definite barrier function (PSBF). Each of the predefined sliding surface is configured to adaptively adjust a magnitude of the control signals based on a proximity of the state of the control system 100 to the predefined sliding surface, thereby minimizing oscillations in the control signals near the pre-defined sliding surface. The PBF ensures that error variables are driven to zero within a finite time, independent of bounded disturbances. The PSBF stabilizes the state of the control system 100 by ensuring error variables converge to a predefined neighborhood of zero without exceeding safety-critical constraints.

The adaptive law module 304, i.e., the adaptive gain module is configured to continuously adjusts the BFASMC gain values based on variations in HEV load and energy source parameters to control both the HESS and the induction motor 118. The non-linear controller 308 deals with nonlinearities (like motor dynamics) of the control system 100, ensuring proper regulation and stability of the induction motor 118 and powertrain. The designed controller 310, i.e., the energy management approach, is a custom-built control algorithm that manages energy distribution across the multiple energy sources, the induction motor 118 control, and overall coordination of the control system 100 for an optimal performance of the HEV. Further, the PI controllers 312-2 and 312-4 regulate the torque and the speed of the induction motor 118 by adjusting an input based on error signals, helping to stabilize the control system 100 under varying conditions. Further, the park transformation module 314 converts three-phase AC signals of the induction motor into a two-axis (d-axis and q-axis current components) reference frame for simplified control of the torque and the magnetic flux of the induction motor 118.

The SVPWM module 316 employees the SVPWM technique that is used to generate control signals for the inverter 116 (i.e., the three-phase inverter 318) for optimizing the voltage applied to the induction motor 118 for efficient operation. Further, the three-phase inverter 318 is configured to convert DC power from the DC bus 114 into three-phase AC power, which is used to drive the induction motor 118. The inverse park transformation module 320 converts the control signals from the d-axis and q-axis current components back into the three-phase AC signals to the induction motor 118, enabling precise control of the induction motor 118 dynamics. The IFOC 322 is used to control the torque and the magnetic flux of the induction motor 118 independently by decoupling them, ensuring high-efficiency performance, especially in varying load conditions.

As depicted in FIG. 3, the control system 100 for the HEV is a sophisticated integration of multiple control loops, designed to optimize the performance and efficiency of multiple energy sources and subsystems. The control system 100 is composed of seven distinct control loops, each dedicated to managing specific aspects of the HEV powertrain and energy management. The seven distinct control loops include four current control loops for the energy sources, i.e., the fuel cell 104, the battery 106, the supercapacitor 108, and the photovoltaic panel 110. Each current control loop is responsible for regulating the voltage of the DC bus 114. Further, the remaining control loops include a speed control loop, a torque control loop, and a flux control loop. The speed control loop ensures the induction motor 118 operates at a desired speed by adjusting the current supplied to the induction motor 118. The torque control loop regulates the torque output of the induction motor 118 to meet the dynamic requirements of the HEV, ensuring smooth acceleration and deceleration. The dynamic requirements may be adjusting the torque during rapid acceleration to meet high power demands or providing regenerative braking torque during deceleration to recover energy and slow the HEV down smoothly. The flux control loop controls the magnetic flux within the induction motor 118 to enhance efficiency and maintain stable operation of the induction motor, especially under varying load conditions. Further, the IFOCS is applied to the induction motor 118, allowing for precise control of the induction motor 118 torque and flux. The SVPWM technique is used to control switches of the inverter 116, optimizing their operation for efficient power conversion and smooth performance of the induction motor 118.

In an embodiment, the above mathematical model is represented in FIG. 3 is to evaluate the performance of the HEV under various operating conditions. This mathematical model is developed based on fundamental electrical laws and by averaging the behavior of the control system 100 of the HEV over an entire duty cycle. The comprehensive state-space dynamical model of the HESS is defined using equations (1)-(5).

$$\dot{y}_1 = \frac{v_{fc}}{L_1} - \frac{R_1 y_1}{L_1} - \frac{y_5(1 - a_1)}{L_1} \tag{1}$$

The above equation (1) is used to model the dynamic behavior of the fuel cell 104. In the equation (1), '$y_1$' represents a state variable representing the current or the magnetic flux associated with the fuel cell 104. '$v_{fc}$' represents the voltage of the fuel cell 104, '$L_1$' represents an inductance associated with a circuit of the fuel cell 104, '$R_1$' represents a resistance in the circuit of the fuel cell 104, '$y_5$' represents a state variable associated with the control system 100, and '$a_1$' represents a control parameter representing a duty cycle or a switching factor for the fuel cell 104.

$$\dot{y}_2 = \frac{v_{bat}}{L_2} - \frac{R_2 y_2}{L_2} - \frac{y_5 a_{23}}{L_2} \tag{2}$$

The above equation (2) is used to model the dynamic behavior of the battery 106. In the equation (2), '$y_2$' represents a state variable representing the current or the magnetic flux associated with the battery 106. '$v_{bat}$' represents the voltage of the battery 106, '$L_2$' represents an inductance associated with a circuit of the battery 106, '$R_2$' represents a resistance in the circuit of the battery 106, '$y_5$' represents a state variable associated with the control system 100, and '$a_{23}$' represents a control parameter that modulates a power flow or a duty cycle of the battery 106.

$$\dot{y}_3 = \frac{v_{sc}}{L_3} - \frac{R_3 y_3}{L_3} - \frac{y_5 a_{45}}{L_3} \tag{3}$$

The above equation (3) is used to model the dynamic behavior of the supercapacitor 108. In the equation (3), '$y_3$' represents a state variable representing the current or the magnetic flux associated with the supercapacitor 108. '$v_{sc}$' represents the voltage of the supercapacitor 108, '$L_3$' represents an inductance associated with a circuit of the supercapacitor 108, '$R_3$' represents a resistance in the circuit of the supercapacitor 108, '$y_5$' represents a state variable associated with the control system 100, and '$a_{45}$' represents a control parameter that modulates the energy flow in or out of the supercapacitor 108.

$$\dot{y}_4 = \frac{v_{pv}}{L_4} - \frac{R_4 y_4}{L_4} - \frac{y_5(1-a_6)}{L_4} \tag{4}$$

The above equation (4) is used to model the dynamic behavior of the photovoltaic panel 110. In the equation (4), '$y_4$' represents a state variable representing the current or the magnetic flux associated with the photovoltaic panel 110. '$v_{pv}$' represents the voltage of the photovoltaic panel 110, '$L_4$' represents an inductance associated with a circuit of the photovoltaic panel 110, '$R_4$' represents a resistance in the circuit of the photovoltaic panel 110, '$y_5$' represents a state variable associated with the control system 100, and '$a_6$' represents a control parameter that modulates the energy flow of the photovoltaic panel 110.

$$\dot{y}_5 = \frac{y_1(1-a_1)}{C} + \frac{y_2 a_{23}}{C} + \frac{y_3 a_{45}}{C} + \frac{y_4(1-a_6)}{C} - \frac{i_0}{C} \tag{5}$$

The above equation (5) represents a SoC or the voltage at the DC bus 114. In the above equation (5), 'C' represents a capacitance representing a total energy storage capacity in the control system 100 and '$i_0$' represents the current flowing through the load.

In an embodiment, '$\alpha_1$', '$\alpha_{23}$', '$\alpha_{45}$', and '$\alpha_6$' represent inputs of the control system 100, which represents the PWM duty cycles used to drive Insulated Gate Bipolar Transistor (IGBT) switch positions. Further, an output of the DC-DC converters 112 is regulated by the switching states of the IGBT switches, each of which can be either ON or OFF. The PWM duty cycle corresponds to a percentage of the time when each IGBT switch remains ON within one PWM duty cycle. These PWM duty cycles are control inputs used in a design of the DC-DC converters 112 to achieve a desired output. Further, the battery 106 can operate in either a charging or discharging mode, and a control input '$\alpha_{23}$' for the battery 106 is defined using an equation (6).

$$a_{23} = [S(1-a_2) + (1-S)a_3] \tag{6}$$

Further, DC-DC buck-boost converters (e.g., the DC-DC buck-boost converter 112-4 and the DC-DC buck-boost converters 112-6) operate in a boost mode when a switch is in an OFF position (S=0) and in a buck mode when the switch is in an ON position (S=1). The operating principle of the supercapacitor 108 is similar to that of the battery 106. A control input '$\alpha_{45}$' is formally defined using an equation (7).

$$a_{45} = [S(1-a_4) + (1-S)a_5] \tag{7}$$

In an embodiment, for modeling of the induction motor 118, a three-phase supply and currents are transformed into a two-phase system in a stationary reference frame along the d-axis and q-axis current components. This transformation simplifies the analysis of a three-phase circuit. The voltages along the d-axis and q-axis current components of the stator, in terms of corresponding flux linkages are obtained using an equation (8).

$$\begin{bmatrix} v_{sd} \\ v_{sq} \end{bmatrix} = R_s \begin{bmatrix} i_{sd} \\ i_{sq} \end{bmatrix} + \frac{d}{dt}\begin{bmatrix} \lambda_{sd} \\ \lambda_{sd}\lambda_{sq} \end{bmatrix} + \omega_d \begin{bmatrix} 0 & -1 \\ 1 & 0 \end{bmatrix}\begin{bmatrix} \lambda_{sd} \\ \lambda_{sq} \end{bmatrix} \tag{8}$$

In the above equation (8), '$v_{sd}$' and '$v_{sq}$' represents the voltages along the stator d-axis and q-axis current components, respectively. '$i_{sd}$' and '$i_{sq}$' represents the current of the stator along the d-axis and q-axis current components. '$\lambda_{sd}$' and '$\lambda_{sd}$' represents the flux linkages along the stator d-axis and q-axis current components. '$R_s$' represents a resistance of the stator windings, '$\omega_d$' represents an angular velocity of the rotor, where $$\omega_d = \frac{d}{dt}\theta_{da},$$

where $\theta_{da}$ is rotor field angle.

$$\text{'}\frac{d}{dt}\text{'}$$

represents a time derivative operator, indicating a rate of change of the flux linkages. In the above equation (8), each vector consists of a pair of elements, where a first element corresponds to the stator voltage of the d-axis current component and the second element corresponds to the stator voltage of the q-axis current component. Further, the stator flux components along the d-axis and q-axis current components are denoted as '$\lambda_{sd}$' and '$\lambda_{sd}$', respectively, and is expressed using an equation (9) and an equation (10).

$$\lambda_{sd} = L_s i_{sd} + L_m i_{rd} \tag{9}$$

$$\lambda_{sq} = L_s i_{sq} + L_m i_{rq} \tag{10}$$

In the above equations (9) and (10), '$L_s$' represents the stator inductance. '$L_m$' represents a mutual inductance between the stator and the rotor. '$i_{rd}$' and '$i_{rq}$' the rotor current component along the d-axis current components and the q-axis current component, respectively. In the above equations (9) and (10), where $L_s=L_{ls}+L_m$.

By substituting inductance values for flux linkage values in the above-mentioned stator voltage depicted via the equations (9) and (10), equations (11) and (12) are obtained.

$$v_{sd} = R_s i_{sd} - \omega_d \lambda_{sq} + L_{ls}\frac{d}{dt}i_{sd} + L_m\frac{d}{dt}(i_{sd} + i_{rd}) \tag{11}$$

$$v_{sq} = R_s i_{sq} + \omega_d \lambda_{sd} + L_{ls}\frac{d}{dt}i_{sq} + L_m\frac{d}{dt}(i_{sq} + i_{rq}) \tag{12}$$

In the above equations (11) and (12), '$L_{ls}$' represents a leakage inductance of the stator.

The rotor d-axis and q-axis current components voltages, expressed in terms of the corresponding flux linkages, are calculated using an equation (13).

$$\begin{bmatrix} v_{rd} \\ v_{rq} \end{bmatrix} = R_r\begin{bmatrix} i_{rd} \\ i_{rq} \end{bmatrix} + \frac{d}{dt}\begin{bmatrix} \lambda_{rd} \\ \lambda_{rq} \end{bmatrix} + \omega_{dA}\begin{bmatrix} 0 & -1 \\ 1 & 0 \end{bmatrix}\begin{bmatrix} \lambda_{rd} \\ \lambda_{rq} \end{bmatrix} \tag{13}$$

In the above equation (13), '$v_{rd}$' and '$v_{rq}$' represents the voltage along the rotor d-axis current component and the q-axis current component, respectively. '$\omega_{dA}$' represents angular velocity of the d-axis in the rotor reference frame. In the above equation (13), $$\frac{d}{dt}\theta_{dA} = \omega_{dA}$$

and $\omega_{dA}=\omega_{sl}=\omega_e-\omega_r$, where '$\omega_{sl}$', '$\omega_e$', and '$\omega_r$' represents a slip angular velocity, a synchronous angular velocity of the stator field, and the rotor angular velocity, respectively.

A first component corresponds to the d-axis current components, while a second component corresponds to the q-axis current component. In terms of currents, the flux linkages of the d-axis and the q-axis current components windings are given as depicted via equations (14) and (15).

$$\lambda_{rd} = L_r i_{rd} + L_m i_{sd} \tag{14}$$

$$\lambda_{rq} = L_r i_{rq} + L_m i_{sq} \tag{15}$$

In the above equations (14) and (15), $L_r=L_{lr}+L_m$ and $L_r$ is the rotor leakage resistance and $L_{lr}$ the rotor leakage inductance. In the above equations (14) and (15), when values of the flux linkages are substituted in terms of the inductance, equations (16) and (17) are obtained.

$$v_{rd} = R_r i_{rd} - \omega_{dA}\lambda_{rq} + L_{lr}\frac{d}{dt}i_{rd} + L_m\frac{d}{dt}(i_{sd} + i_{rd}) \tag{16}$$

$$v_{rq} = R_s i_{rq} + \omega_{dA}\lambda_{rd} + L_{lr}\frac{d}{dt}i_{rq} + L_m\frac{d}{dt}(i_{sq} + i_{rq}) \tag{17}$$

In the above equations (16) and (17), $v_{rd}=0$ and $v_{rq}=0$. In an embodiment, an acceleration of the induction motor 118 is determined by calculating a difference between an electromagnetic torque and a load torque, both of which act on a combined inertia '$J_{eq}$' of the induction motor 118 and the load torque, as depicted via an equation (18).

$$\frac{d\omega_{mech}}{dt} = \frac{1}{J_{eq}}(T_{em} - T_l) \tag{18}$$

In the above equation (18), $$\text{`}\frac{d\omega_{mech}}{dt}\text{'}$$

represents a rate of change of a mechanical angular velocity of the induction motor 118, representing the acceleration of rotor of the induction motor 118. '$T_{em}$' represents the electromagnetic torque produced by the induction motor 118. '$T_l$' represents the load torque. Further, by substituting, $$T_{em} = \frac{pL_m}{2}\left(i_{sq}i_{rd-i_{sd}}i_{rq}\right)$$

in the above equation (18), an equation (19) is obtained.

$$\frac{d\omega_{mech}}{dt} = \frac{\frac{pL_m\left(i_{sq}i_{rd-i_{ed}}i_{rq}\right)}{2} - T_l}{J_{eq}} \tag{19}$$

In the above equation (19), 'p' represents a number of pole pairs in the induction motor 118.

Further, the rotor's actual mechanical speed in radians per second is given by an equation (20).

$$\omega_{mech} = \frac{2}{p}w_m \tag{20}$$

In the above equation (20), '$\omega_{mech}$' represents a mechanical angular velocity of the rotor, and '$w_m$' represents the synchronous angular velocity of the induction motor 118. A Table 1 below represents exemplary parameters of the multiple energy sources.

TABLE 1

| Sources | Specifications |
|---|---|
| Fuel cell | 350 Volts (V), 250 Ampere(A), 34 Kilowatt (KW) |
| Battery | 88 V, 13.9 Ampere - hour (Ah), Lithium-ion |
| Super-capacitor | 205 V, 2700 Farads (F) |
| PV | 275 V, 5 A, 1.3 KW |

In an embodiment, a key distinction between a Direct Vector Control (DVC) and an Indirect Vector Control (IVC) lies in how a field angle of the rotor is determined. In a Direct Field-Oriented Control (FOC), a flux angle of the rotor is determined using a hall-effect sensor, a search coil, or other measurement methods to detect an orientation of an airgap flux. However, using sensors can be costly, as special modifications are required to install flux sensors. Additionally, the rotor flux cannot be directly measured. This presents challenges, as the stator resistance voltage drop significantly influences the stator voltage equation, and fluctuations in flux levels and temperature can lead to inaccuracies in the rotor flux detection at low speeds.

In contrast, the IVC estimates the flux angle using machine parameters. This technique involves computing the field angle through estimation methods, where the speed of the flux linkage is a sum of a rotor speed and a slip speed. This relationship is expressed using an equation (21).

$$\theta_e = \int \omega_e dt = \int (\omega_r + \omega_{sl})dt = (\theta_r + \theta_{sl}) \tag{21}$$

In the above equation (21), '$\theta_e$' represents an electromagnetic field angle, '$\omega_e$' represents an electromagnetic angular velocity, '$\omega_r$' represents a rotor angular velocity, '$\omega_{sl}$' represents a slip angular velocity, '$\theta_r$' represents a rotor angle, and '$\theta_{sl}$' represents a slip angle. The rotor circuit is depicted via equations (22) and (23).

$$\frac{d}{dt}\lambda_{rd} + \frac{R_r}{L_r}\lambda_{rd} - \frac{L_m}{L_r}1_{sd}R_r - \omega_{sl}\lambda_{rd} = 0 \tag{22}$$

In a process of vector control, the d-axis current component is aligned with the rotor flux linkage space vector in such a way that there is no rotor flux linkage in the q-axis current component as depicted via an equation (24).

$$\lambda_{rq}(t) = 0 \tag{24}$$

In the above equation (24), '$\lambda_{rq}(t)$' a rotor flux linkage along the q-axis (in Webers), which represents the component of the rotor flux in the q-axis at time t. Further, by replacing '$\lambda_{rq}$' in the equation (15) with zero, an equation (25) is obtained.

$$i_{rq} = -\frac{L_m}{L_r}i_{sq} \tag{25}$$

In an embodiment, a fact that the d-axis is always aligned with '$\vec{\lambda}_{rq}$', causing '$\lambda_{rq}$' to be 0, also causes '$\frac{d}{dt}\lambda_{rq}$' to be zero. Also, in a squirrel cage rotor '$v_{rq}$'=0. Further, by replacing these conditions in the equations (14), (15), (16), and (17), an equation (26) is obtained.

$$\omega_{sl} = -\frac{R_r}{\lambda_r}i_{rq} \tag{26}$$

Further, by substituting value of '$i_{rq}$' from the equation (25), an equation (27) is obtained.

$$\omega_{sl} = \frac{L_m R_r}{\lambda_r L_r}i_{sq} \tag{27}$$

Further, a developed electromechanical torque is defined using an equation (28).

$$T_{em} = \frac{3}{2}\frac{p}{2}\frac{L_m}{L_r}\lambda_r i_{sq} \tag{28}$$

For the BFASMC in the HEV to be considered effective, the BFASMC must efficiently achieve objectives that includes regulation of the voltage of the DC bus 114 under varying load conditions, tracking of currents from the multiple energy sources to their desired values, tracking the speed of the induction motor 118 to its reference value, and ensuring a global asymptotic stability of the control system 100. In an embodiment, a dynamic control system exhibits non-minimum phase behavior, which presents challenges in regulating the DC bus voltage to the desired level at the DC bus 114. To address this, an indirect methodology based on a power balance equation is implemented as depicted via equations (29) and (30).

$$P_{input} = P_{output} \tag{29}$$

$$P_{fc} + P_{bat} + P_{sc} + P_{pv} = P_{output} \tag{30}$$

In the above equation (30), $P_{fc}$, $P_{bat}$, $P_{sc}$ and $P_{pv}$ represent a power of the fuel cell 104, the battery 106, the supercapacitor 108, and the photovoltaic panel 110, respectively. Further, based on the equation (30), an equation (31) is obtained.

$$x_{1ref} = \omega\left(\frac{P_{out} - P_{bat} - P_{sc} - P_{pv}}{v_{fc}}\right) \tag{31}$$

In the equation (31), '$x_{1ref}$' represents a reference value and '$\omega$' a constant that represents various power losses, such as power loss due to the inductance. A Table 2 below represents values of various exemplary parameters of the DC-DC converters 112.

TABLE 2

| Parameters | Values |
|---|---|
| Inductance $L_1$, $L_2$, $L_3$ and $L_4$ | 3.3 millihenries (mH) |
| Resistances $R_1$, $R_2$, $R_3$ and $R_4$ | 20 milliohms (m(Ω)) |
| Capacitance $C_1$ and $C_2$ | 1.66 millifarads (mF) |
| constant (ω) | 1.0004 |
| Switching frequency $f_s$ | 10 hertz (Hz) |

In an embodiment, a non-linear variable structure control method known as the SMC helps to achieve stability of the control system trajectory. For this, a pre-defined sliding surface is drawn, and a controller (e.g., the BFASMC) is designed to assist the control system 100 to reach its desired value by bringing the control system 100 to the predefined sliding surface. Once the control system state reaches the predefined sliding surface, a control law ensures that the state continues along the predefined sliding surface, ultimately reaching a desired value. In order to track all states to their desired values, an error term as depicted via an equation (32) is defined.

$$ej = yj - yjref \tag{32}$$

In the above equation (32), 'ej' represents an error term for the $j^{th}$ state, 'yj' represents an actual value of the $j^{th}$ state in the control system 100, and 'yjref' represents a desired value of the $j^{th}$ state. In an embodiment, consider 'k' as 1, 2, 3, and 4. Further, '$\dot{y}_{1ref}$', '$\dot{y}_{2ref}$', '$\dot{y}_{3ref}$', and '$\dot{y}_{4ref}$' are reference values of the fuel cell 104, the battery 106, the supercapacitor 108, and the photovoltaic panel 110 currents. By taking time derivative of the error terms from the equation (32), an equation (33) is obtained.

$$\dot{e}_k = \dot{y}_k - \dot{y}_{kref} \tag{33}$$

For j iteration through 1, 2, 3, and 4 and by putting values of '$\dot{y}_1$', '$\dot{y}_2$', '$\dot{y}_3$', and '$\dot{y}_4$' in the equations (1), (2), (3), and (4), below equations (34), (35), (36), and (37) are obtained.

$$\dot{e}_1 = \frac{v_{fc}}{L_1} - \frac{R_1 y_1}{L_1} - \frac{y_5(1-a_1)}{L_1} - \dot{y}_{1ref} \tag{34}$$

$$\dot{e}_2 = \frac{v_{bat}}{L_2} - \frac{R_2 y_2}{L_2} - \frac{y_5 a_{23}}{L_2} - \dot{y}_{2ref} \tag{35}$$

$$\dot{e}_3 = \frac{v_{sc}}{L_3} - \frac{R_3 y_3}{L_3} - \frac{y_5 a_{45}}{L_3} - \dot{y}_{3ref} \tag{36}$$

$$\dot{e}_4 = \frac{v_{pv}}{L_4} - \frac{R_4 y_4}{L_4} - \frac{y_5(1-a_6)}{L_4} - \dot{y}_{4ref} \tag{37}$$

In an embodiment, in general sliding surface for a multi-input multi-output (MIMO) system is defined as depicted via an equation (38).

$$S = [S_1, S_2, \ldots, S_n]^T \tag{38}$$

Further, for the corresponding control inputs, four sliding surfaces '$S_1$', '$S_2$', '$S_3$', and '$S_4$' are defined as using an equation (39).

$$S_p = c_p e_p \tag{39}$$

In an embodiment, 'p' encompasses 1, 2, 3, and 4. '$c_1$', '$c_2$', '$c_3$', and '$c_4$' are positive constants, each corresponding to a unique equation within a series. Further, by taking time derivative of the equation (39) and substituting the values of '$\dot{e}_1$', '$\dot{e}_2$', '$\dot{e}_3$', and '$\dot{e}_4$', from the equations (34) to (37), equations (40), (41), (42), and (43) are obtained.

$$\dot{S}_1 = c_1\left(\frac{v_{fc}}{L_1} - \frac{R_1 y_1}{L_1} - \frac{y_5(1-a_1)}{L_1} - \dot{y}_{1ref}\right) \tag{40}$$

$$\dot{S}_2 = c_2\left(\frac{v_{bat}}{L_2} - \frac{R_2 y_2}{L_2} - \frac{y_5 a_{23}}{L_2} - \dot{y}_{2ref}\right) \tag{41}$$

$$\dot{S}_3 = c_3\left(\frac{v_{sc}}{L_3} - \frac{R_3 y_3}{L_3} - \frac{y_5 a_{45}}{L_3} - \dot{y}_{3ref}\right) \tag{42}$$

$$\dot{S}_4 = c_4\left(\frac{v_{pv}}{L_4} - \frac{R_4 y_4}{L_4} - \frac{y_5(1-a_6)}{L_4} - \dot{y}_{4ref}\right) \tag{43}$$

In order to perform stability analysis and to determine a desired dynamic of a damping term, a Lyapunov candidate function 'V' is calculated as depicted via equations (44) and (45).

$$V = \frac{S_1^2}{2} + \frac{S_2^2}{2} + \frac{S_3^2}{2} + \frac{S_4^2}{2} \tag{44}$$

$$\dot{V} = S_1\dot{S}_1 + S_2\dot{S}_2 + S_3\dot{S}_3 + S_4\dot{S}_4 \tag{45}$$

In an embodiment, by putting the values of '$\dot{S}_1$', '$\dot{S}_2$', '$\dot{S}_3$' and '$\dot{S}_4$' from the equations 40 to (43) in the above equation (45), and equation (46) is obtained.

$$\begin{aligned}\dot{V} = {} & S_1\left(c_1\left(\frac{v_{fc}}{L_1} - \frac{R_1 y_1}{L_1} - \frac{y_5(1-a_1)}{L_1} - \dot{y}_{1ref}\right)\right) \\ & + S_2\left(c_2\left(\frac{v_{bat}}{L_2} - \frac{R_2 y_2}{L_2} - \frac{y_5 a_{23}}{L_2} - \dot{y}_{2ref}\right)\right) \\ & + S_3\left(c_3\left(\frac{v_{sc}}{L_3} - \frac{R_3 y_3}{L_3} - \frac{y_5 a_{45}}{L_3} - \dot{y}_{3ref}\right)\right) \\ & + S_4\left(c_4\left(\frac{v_{pv}}{L_4} - \frac{R_4 y_4}{L_4} - \frac{y_5(1-a_6)}{L_4} - \dot{y}_{4ref}\right)\right)\end{aligned} \tag{46}$$

Further, to meet the Lyapunov stability criterion, which requires $\dot{V} \leq 0$, constraints depicted via equations (47), (48), (49), and (50) are considered.

$$-A_1|S_1|^{\alpha}\text{sign}\left(\frac{S_1}{\rho_1}\right) = \frac{c_1 v_{fc}}{L_1} - \frac{c_1 R_1 y_1}{L_1} - \frac{c_1 y_5(1-a_1)}{L_1} - c_1\dot{y}_{1ref} \tag{47}$$

$$-A_2|S_2|^{\beta}\text{sign}\left(\frac{S_2}{\rho_2}\right) = \frac{c_2 v_{bat}}{L_2} - \frac{c_2 R_2 y_2}{L_2} - \frac{c_1 y_5(1-a_{23})}{L_2} - c_2 y_{2ref} \tag{48}$$

$$-A_3|S_3|^{\gamma}\text{sign}\left(\frac{S_3}{\rho_3}\right) = \frac{c_3 v_{sc}}{L_3} - \frac{c_3 R_3 y_3}{L_3} - \frac{c_3 y_5(1-a_{45})}{L_3} - c_3\dot{y}_{3ref} \tag{49}$$

$$-A_4|S_4|^{\zeta}\text{sign}\left(\frac{S_4}{\rho_4}\right) = \frac{c_4 v_{pv}}{L_4} - \frac{c_4 R_4 y_4}{L_4} - \frac{c_4 y_5(1-a_6)}{L_4} - c_4 y_{4ref} \tag{50}$$

In the above equations (47) to (50), $$\dot{s}_i = -A_i|S_i|^{\zeta}\text{sign}\left(\frac{S_i}{\rho_i}\right)$$

which is a reaching law of a SMC technique. It is referred to as a power rate reaching law and enhances a pace of convergence when the control system state is far away from a switching manifold. Further, where the BFASMC gains $A_1$, $A_2$, $A_3$ and $A_4$ are constant design parameters with positive values. $|S_i|^{\alpha}$, $|S_i|^{\beta}$, $|S_i|^{\gamma}$, $|S_i|^{\zeta}$ help to ensure the convergence of the control system 100 to the pre-defined sliding surfaces. $\alpha$, $\beta$, $\gamma$ and $\zeta$ are positive constant numbers often selected from an interval between 0 and 1. $\rho_1$, $\rho_2$, $\rho_3$ and $\rho_4$ help to minimize the chattering effect. Further, a signum function is defined using an equation (51).

$$\text{sign}(y) = \begin{cases} -1, & \text{if } S_i < 0 \\ 0, & \text{if } S_i = 0 \\ 1, & \text{if } S_i > 0 \end{cases} \tag{51}$$

In the above equation (51), i=1, 2, 3, 4. Further, upon solving the above equations (47) to (50), or control inputs $\alpha_1$, $\alpha_{23}$, $\alpha_{45}$ and $\alpha_6$, equations (52), (53), (54), and (55) are obtained.

$$a_1 = \frac{L_1}{c_1 y_5}\left(\frac{c_1 R_1 y_1}{L_1} - \frac{c_1 v_{fc}}{L_1} + \frac{c_1 y_5}{L_1} + c_1 \dot{y}_{1ref} - A_1 |S_1|^{\alpha} \text{sign}\left(\frac{S_1}{\rho_1}\right)\right) \quad (52)$$

$$a_{23} = \frac{L_2}{c_2 y_5}\left(-\frac{c_2 R_2 y_2}{L_2} + \frac{c_2 v_{bat}}{L_2} - c_2 \dot{y}_{2ref} - A_2 |S_2|^{\beta} \text{sign}\left(\frac{S_2}{\rho_2}\right)\right) \quad (53)$$

$$a_{45} = \frac{L_3}{c_3 y_5}\left(-\frac{c_3 R_3 y_3}{L_3} + \frac{c_3 v_{sc}}{L_3} - c_3 \dot{y}_{3ref} - A_3 |S_3|^{\gamma} \text{sign}\left(\frac{S_3}{\rho_3}\right)\right) \quad (54)$$

$$a_6 = \frac{L_4}{c_4 y_5}\left(\frac{c_4 R_4 y_4}{L_4} - \frac{c_4 v_{pv}}{L_4} + \frac{c_4 y_5}{L_4} + c_4 \dot{y}_{4ref} - A_4 |S_4|^{\zeta} \text{sign}\left(\frac{S_4}{\rho_4}\right)\right) \quad (55)$$

Further, to prove stability, using the equations (52) to (55) and the equation (46), an expression for a time derivative of the Lyapunov candidate function can be written as depicted via an equation (56).

$$\dot{V} = -S_1 A_1 |S_1|^{\alpha} \text{sign}\left(\frac{S_1}{\rho_1}\right) - S_3 A_3 |S_3|^{\gamma} \text{sign}\left(\frac{S_3}{\rho_3}\right) - S_4 A_4 |S_4|^{\zeta} \text{sign}\left(\frac{S_4}{\rho_4}\right) \quad (56)$$

Further, by taking into account properties of the sign(·) function defined in the equation (51), the equation (56) can be simplified as depicted via an equation (57).

$$\dot{V} = -S_1 A_1 |S_1|^{\alpha} \text{sign}\left(\frac{S_1}{\rho_1}\right) - S_2 A_2 |S_2|^{\beta} \text{sign}\left(\frac{S_2}{\rho_2}\right) - S_4 A_4 |S_4|^{\zeta} \text{sign}\left(\frac{S_4}{\rho_4}\right) \leq 0 \quad (57)$$

In an embodiment, the Lyapunov stability criterion analysis demonstrates that the proposed BFASMC satisfies the stability requirements, which ensures the convergence of errors to zero within a finite time and an asymptotic stability of the control system 100.

Further, the d-axis and q-axis current components voltages of the stator can be stated using equations (58) and (59).

$$v_{sd} = R_s i_{sd} + \sigma L_s \frac{d}{dt} 1_{sd} + \frac{L_m}{L_r}\frac{d}{dt}\lambda_{rd} - \omega_d \sigma L_s i_{sq} \quad (58)$$

$$v_{sq} = R_s i_{sq} + \sigma L_s \frac{d}{dt} 1_{sq} + \omega_d \frac{L_m}{L_r}\frac{d}{dt}\lambda_{rd} - \omega_d \sigma L_s i_{sd} \quad (59)$$

In the above equation (58), only initial two terms on a right are because of d-axis current $i_{sd}$ and $$\frac{d}{dt} I_{sd}.$$

Other terms are resulting from $\lambda_{rd}$ and $i_{sq}$ are provident as disturbances. Likewise, in the equation (59), labels due to $\lambda_{rd}$ and $i_{sd}$ are provident as disturbances. Therefore, the equations (58) and (59) can be rewritten as equations (60) and (61).

$$v_{sd} = R_s i_{sd} + \sigma L_s \frac{d}{dt} 1_{sd} \quad (60)$$

$$v_{sq} = R_s i_{sq} + \sigma L_s \frac{d}{dt} 1_{sq} \quad (61)$$

In an embodiment, the PI controllers 312-2 and 312-4 are used in both speed and current control loops. For a speed loop, a PI controller (e.g., the PI controller 312-2) gains are determined based on a phase margin of 60° and an open-loop crossover frequency of 25 radians per second. To calculate proportional and integral gains for current loops, it is assumed that ideal compensation is achieved. Further, the reference voltages for $V_{sd}$ and $V_{sq}$ are calculated using the stator d-axis and q-axis current components reference currents $i_{sd}$, $i_{sq}$, $\lambda_{rd}$ and $\omega_d$. The final stator voltages $V_a$, $V_b$, and $V_c$ are provided by a DC-to-AC inverter (e.g., the inverter 116), utilizing the SVPWM technique. In an embodiment, a mechanical speed equation for the induction motor 118 (represented as IM) is typically represented using an equation (62).

$$\omega_{mech1} = \frac{T_{em} - T_l}{J_{eq}} \quad (62)$$

In the above equation (62), 'J' is an inertia constant, '$T_l$' is the external load, and where p is a pole number and $T_{em}$ denotes the generated torque of the induction motor 118. Further, by substituting the value of $T_{em}$, an equation (63) is obtained.

$$\omega_{mech} = \frac{\frac{3pL_m}{22L_r}\lambda_r i_{sq} - T_l}{J_{eq}} \quad (63)$$

Further, by simplifying the equation (63), an equation (64) is obtained.

$$\omega_{mech} = b i_{sq} - f \quad (64)$$

In the equation (63), $$b = \frac{3}{2}\frac{p}{2}\frac{L_m}{L_r}\frac{\lambda_r}{J_{eq}} \text{ and } f = \frac{T_l}{J_{eq}}.$$

Further, a speed error of the induction motor is calculated using equations (64) and (65).

$$e_5 = \omega_{mech} - \omega_{mechref} \quad (64)$$

$$\dot{e}_5 = \dot{\omega}_{mech} - \dot{\omega}_{mechref} \quad (65)$$

Further, upon putting values of '$\omega_{mech}$', an equation (66) is obtained.

$$e_5 = b i_{sq} - f - \dot{\omega}_{mechref} \quad (67)$$

Further, the predefined sliding surface can be defined as depicted via an equation (68).

$$S_5 = c_5 e_5 \quad (68)$$

Further, based on the time derivative of the equation (69), an equation (70) is obtained.

$$\dot{S}_1 = c_5\dot{e}_5 \tag{69}$$

By substituting the value of '$\dot{e}_5$' from the equation (67), an equation (70) is obtained.

$$\dot{S}_5 = c_5(bi_{sq} - f - \dot{\omega}_{mechref}) \tag{70}$$

In an embodiment, following Lyapunov candidate function as depicted via an equation (71) and an equation (72) is selected for error.

$$V = \frac{S_5^2}{2} \tag{71}$$

$$\dot{V} = S_5\dot{S}_5 \tag{72}$$

Further, by putting the value of '$S_1$', an equation (73) is obtained.

$$\dot{V} = S_5(c_5(bi_{sq} - f - \dot{\omega}_{mechref})) \tag{73}$$

In an embodiment, for the SMC design and asymptotic stability of the control system, '$S_1$' can be substituted by following parameters as depicted via an equation (74).

$$\dot{S}_5 = -A_5|S_5|^{\delta}\operatorname{sign}\left(\frac{S_5}{0.5}\right) \tag{74}$$

Further, to meet a condition of V≤0, following constraints are considered as depicted via an equation (75).

$$c_5bi_{sq} - c_5f - c_5\dot{\omega}_{mechref} = -A_5|S_5|^{\sigma}\operatorname{sign}\left(\frac{S_5}{0.5}\right) \tag{75}$$

In an embodiment, by solving the equation (75) for finding the control input '$i_{sq}$', equations (76), (77), and (78) are obtained.

$$i_{sq} = \frac{1}{c_5b}\left(-A_5|S_5|^{\delta}\operatorname{sign}\left(\frac{A_5}{0.5}\right) + c_5f + c_5\dot{\omega}_{mechref}\right) \tag{76}$$

$$\dot{V} = -S_5A_5|S_5|^{\delta}\operatorname{sign}\left(\frac{S_1}{\rho_1}\right) \tag{77}$$

$$\dot{V} = -S_5A_5|S_5|^{\delta}\operatorname{sign}\left(\frac{S_1}{\rho_1}\right) \leq 0 \tag{78}$$

In an embodiment, suppose the dynamics of a first-order system are given as depicted via an equation (79).

$$y'(t) = u(t) + \delta(t) \tag{79}$$

In the above equation (79), in this context, '$\delta(t)$' represents a disturbance of the control system 100, which is a bounded function with an unknown upper bound. However, there exists a positive bound '$\delta_{max}$', such that the disturbance satisfies $|\delta(t)| \leq \delta_{max}$. $\gamma(t) \in R$ represents an output of the control system 100. Further, to ensure a stability of the control system 100, a first-order sliding mode controller (FOSMC) is required, which is expressed using an equation (80).

$$u(t) = -A(t)\operatorname{sign}(y) \tag{80}$$

The SMC ensures closed-loop insensitivity to disturbances and guarantees finite-time convergence. However, the implementation of the FOSMC faces two major challenges, i.e., unwanted chattering and optimal gain selection. To address these challenges, the BFASMC is used. In an embodiment, two distinct approaches are proposed to define the barrier function. Let $\phi > 0$ be a fixed constant. The barrier function is defined as an even, continuous function, $A_b$: $\gamma \in [-\phi, \phi[ \rightarrow A_b(\gamma) \in [b, \infty]$ which is strictly increasing on an interval $[0, \phi]$. In an embodiment, the PBF and the PSBF is given as depicted via an equation (81) and an equation (82), respectively.

$$A_{p,b}(y) = \frac{\overline{\phi}N}{\phi - |y|},\ A_{p,b}(0) = \overline{N} > 0 \tag{81}$$

$$A_{p,b}(y) = \frac{|y|}{\phi - |y|},\ A_{p,b}(0) = 0 \tag{82}$$

In an embodiment, when $\phi \rightarrow 0$, then $A \rightarrow 0$. When an output variable is in vicinity of origin, i.e., $$\frac{|y|}{\phi} < 1,$$

then $$A \approx \frac{|y|}{\phi},$$

and this guarantees a convergence of state x to zero. Further, errors for stable working of the HESS are defined as depicted via an equation (83).

$$Sq = yq - yqref \tag{83}$$

In an embodiment, When 'q' is specified as 1, 2, 3, and 4. Upon taking a time derivative of the above equation (83) and putting the values of $y'_1$, $y'_2$, $y'_3$ and $y'_4$, equations (84), (85), (86), and (87) are obtained.

$$\dot{S}_1 = \frac{v_{fc}}{L_1} - \frac{R_1y_1}{L_1} - \frac{y_5(1-a_1)}{L_1} - \dot{y}_{1ref} + \theta_1 \tag{84}$$

$$\dot{S}_2 = \frac{v_{bat}}{L_2} - \frac{R_2y_2}{L_2} - \frac{y_5a_{23}}{L_2} - \dot{y}_{2ref} + \theta_2 \tag{85}$$

$$\dot{S}_3 = \frac{v_{sc}}{L_3} - \frac{R_3y_3}{L_3} - \frac{y_5a_{45}}{L_3} - \dot{y}_{3ref} + \theta_3 \tag{86}$$

-continued $$\dot{S}_4 = \frac{v_{pv}}{L_4} - \frac{R_4 y_4}{L_4} - \frac{y_5(1-a_6)}{L_4} - \dot{y}_{4ref} + \theta_4 \tag{87}$$

In the equations (84), (85), (86), and (87), $\theta_1$, $\theta_2$, $\theta_3$, and $\theta_4$ are uncertain parameters, and the BFASMC attempts to adaptively reduce these parameters. By solving the equations (84), (85), (86), and (87), for $\alpha_1$, $\alpha_{23}$, $\alpha_{45}$, and $\alpha_6$, equations (88), (89), (90), and (91) are obtained.

$$a_1 = \frac{L_1}{y_5}\left(\frac{R_1 y_1}{L_1} - \frac{v_{fc}}{L_1} + \frac{y_5}{L_1} + \dot{y}_{1ref} + \dot{S}_1\right) \tag{88}$$

$$a_{23} = \frac{L_2}{y_5}\left(-\frac{R_2 y_2}{L_2} + \frac{v_{bat}}{L_2} - \dot{y}_{2ref} + \dot{S}_2\right) \tag{89}$$

$$a_{45} = \frac{L_3}{y_5}\left(-\frac{R_3 y_3}{L_3} + \frac{v_{sc}}{L_3} - \dot{y}_{3ref} + \dot{S}_3\right) \tag{90}$$

$$a_6 = \frac{L_4}{y_5}\left(\frac{R_4 y_4}{L_4} - \frac{v_{pv}}{L_4} + \frac{y_5}{L_4} + \dot{y}_{4ref} + \dot{S}_4\right) \tag{91}$$

To converge errors to zero, the barrier function for $\dot{S}_1$, $\dot{S}_2$, $\dot{S}_3$, and $\dot{S}_4$ can be defined using equations (92), (93), (94), and (95).

$$\dot{S}_1 = -A_1|S_1|\text{sign}(S_1) \tag{92}$$

$$\dot{S}_2 = -A_2|S_2|\text{sign}(S_2) \tag{93}$$

$$\dot{S}_3 = -A_3|S_3|\text{sign}(S_3) \tag{94}$$

$$\dot{S}_4 = -A_4|S_4|\text{sign}(S_4) \tag{95}$$

In the equations (92), (93), (94), and (95), $A_1$, $A_2$, $A_3$, and $A_4$ are adaptive gains. Further, based on the equations (92), (93), (94), and (95), equations (96), (97), (98) and (99) are obtained.

1.

$$a_1 = 1 + \frac{L_1}{y_5}\left(\frac{y_1}{R_1 L_1} - \frac{v_{fc}}{L_1} + \dot{y}_{1ref} - A_1|S_1|\text{sign}(S_1)\right) \tag{96}$$

2.

$$a_{23} = \frac{L_2}{y_5}\left(-\frac{y_2}{R_2 L_2} + \frac{v_{bat}}{L_2} - \dot{y}_{2ref} + A_2|S_2|\text{sign}(S_2)\right) \tag{97}$$

3.

$$a_{45} = \frac{L_3}{y_5}\left(-\frac{y_3}{R_3 L_3} + \frac{v_{sc}}{L3} - \dot{y}_{3ref} + A_3|S_3|\text{sign}(S_3)\right) \tag{98}$$

4.

$$a_6 = 1 + \frac{L_4}{y_5}\left(\frac{y_4}{R_4 L_4} - \frac{v_{pv}}{L_4} + \dot{y}_{4ref} - A_4|S_4|\text{sign}(S_4)\right) \tag{99}$$

In an embodiment, there exists $t^{-}$, the smallest root of the equation $|S(t)| \geq \phi^2$, for any $S(0)$ and $\phi > 0$, such that for all $t \geq t^{-}$, an inequality $|S(t)| < \phi$ holds. Hence, the proposed BFASMC is stable, is also explained using Lyapunov stability equations. Following Lyapunov candidate function has been considered for the stability analysis of the BFASMC, as depicted via an equation (100).

$$V(S(t), A(S(t))) = \frac{1}{2}S^2(t) + \frac{1}{2}(A(S(t)) - A(0))^2 \tag{100}$$

Further, by taking the time derivative of the equation (100), equation (101) is obtained.

$$\dot{V}(S(t), A(S(t))) \leq -\sigma V^{\frac{1}{2}}(S(t), A(S(t))) \tag{101}$$

In the equation (101), $$\sigma > 0,\ V^{\frac{1}{2}}(S(t), A(S(t))) \geq 0,$$

hence the equation (101) is re-written as an equation (102).

$$\dot{V}(S(t), A(S(t))) \leq 0 \tag{102}$$

In an embodiment, for stable working of the induction motor 118, a speed error can be defined using an equation (103).

$$s_5 = \omega_{mech} - \omega_{mechref} \tag{103}$$

By taking the of the equation (103) with respect to time offered, equation (104), (105), (106), (107) and (108) are obtained.

$$\dot{s}_5 = \dot{\omega}_{mech} - \dot{\omega}_{mechref} \tag{104}$$

$$\dot{s}_5 = bi_{sq} - f - \dot{\omega}_{mechref} \tag{105}$$

$$\dot{S}_5 = bi_{sq} - f - \dot{\omega}_{mechref} + \theta_5 \tag{106}$$

$$i_{sq} = \frac{1}{b}\left(\dot{S}_5 + f + \dot{\omega}_{mechref}\right) \tag{107}$$

$$\dot{S}_5 = -A_5|S_5|\text{sign}(S_5) \tag{108}$$

Finally, a speed control law is obtained as depicted via an equation (109).

$$i_{sq} = \frac{1}{b}(-A_5|S_5|\text{sign}(S_5) + f + \dot{\omega}_{mechref}) \tag{109}$$

Further, for stability analysis, following Lyapunov candidate function has been used which comprises of both output variable and adaptive gain as depicted via an equation (110).

$$V(S(t), A(S(t))) = \frac{1}{2}S^2(t) + \frac{1}{2}(A(S(t)) - A(0))^2 (106) \tag{110}$$

Further, by taking the time derivative of the equation (110), an equation (111) is obtained.

$$\dot{V}(S(t), A(S(t))) \le -\eta V^{\frac{1}{2}}(S(t), A(S(t))) \quad (111)$$

In the equation (111), $$\eta > 0,\ V^{\frac{1}{2}}(S(t), A(S(t))) \ge 0,$$

so the equation (111) is re-written as an equation (112).

$$\dot{V}(S(t), A(S(t))) \le 0 \quad (111)$$

A Table 3 below represents exemplary parameters values for the SMC and the BFASMC.

TABLE 3

| Parameter | Values |
|---|---|
| | SMC |
| $A_1$, $A_2$, $A_3$, $A_4$, A5 | 3000, 2000, 1500, 1500, 1000 |
| c1,c2,c3,c4,c5 | 5, 1, 1, 1, 1 |
| α, β, γ, ζ, δ | 0.8, 0.5, 0.5, 0.7, 0.8 |
| ρ1, ρ2, ρ3, ρ4, ρ5 | 0.5, 0.5, 0.5, 0.5, 0.5 |
| | BFASMC |
| A | 1000 |
| ϕ | 0.04 |

A Table 4 below represents performance evaluation of proposed control schemes for the HESS. In the Table 4, IAE stands for an integral absolute error, ISE stands for an integral square error, and ITAE stands for an integral time absolute error.

TABLE 4

| Control Strategy | ISE | IAE | ITAE |
|---|---|---|---|
| | | SMC | |
| e2, | 5.119 | 0.1559 | 0.1317 |
| e2, | 2.166 | 0.1347 | 0.2443 |
| e3, | 0.6403 | 0.06613 | 0.12 |
| e4, | 2.385 | 0.03115 | 0.04853 |
| | | BFASMC | |
| el, | 1.385 | 0.07273 | 0.08944 |
| e2, | 0.1683 | 0.02004 | 0.02861 |
| e3, | 0.03445 | 0.01324 | 0.02032 |
| e4, | 0.01089 | 0.05615 | 0.09311 |

A Table 5 below represents performance evaluation of proposed control schemes for the IVC based induction motor model.

TABLE 5

| Control Strategy | ISE | IAE | ITAE |
|---|---|---|---|
| | | PI | |
| Speed | 4.243 | 1.176 | 0.6394 |
| Flux | 2.166 | 0.5168 | 0.04907 |
| Torque | 11.108 | 6.255 | 0.1424 |
| e4, | 2.385 | 0.03115 | 0.04853 |
| | | SMC | |

TABLE 5-continued

| Control Strategy | ISE | IAE | ITAE |
|---|---|---|---|
| Speed | 0.01994 | 0.08889 | 0.04256 |
| Flux | 4.478 | 1.832 | 0.1499 |
| Torque | 8.646 | 3.26 | 1.964 |
| | | BFASMC | |
| Speed | 0.008322 | 0.04214 | 0.02193 |
| Flux | 1.4 | 0.478 | 0.05777 |
| Torque | 6.97 | 1.311 | 0.1415 |

In an embodiment, the performance of the BFASMC is evaluated through both simulation and a Hardware-in-the-Loop (HIL) testing under various operating conditions. In particular, the proposed controller is simulated and verified using MATLAB/Simulink® (2022*a*) under a range of load conditions. Primary objectives of the simulation are to regulate the DC bus voltage, control the current flow by generating reference currents for the power sources, and ensure accurate speed reference tracking. The BFASMC performance is compared with other controllers (e.g., the PI controller and the SMC) based on its efficiency in achieving these goals with minimal errors.

Further, specifications of the energy sources and parameters of the DC-DC converters are outlined in the Table 1 and the Table 2, respectively. In addition, the controller gain parameters, as presented in the Table 3, are fine-tuned to effectively track the desired reference values.

Figure 4:
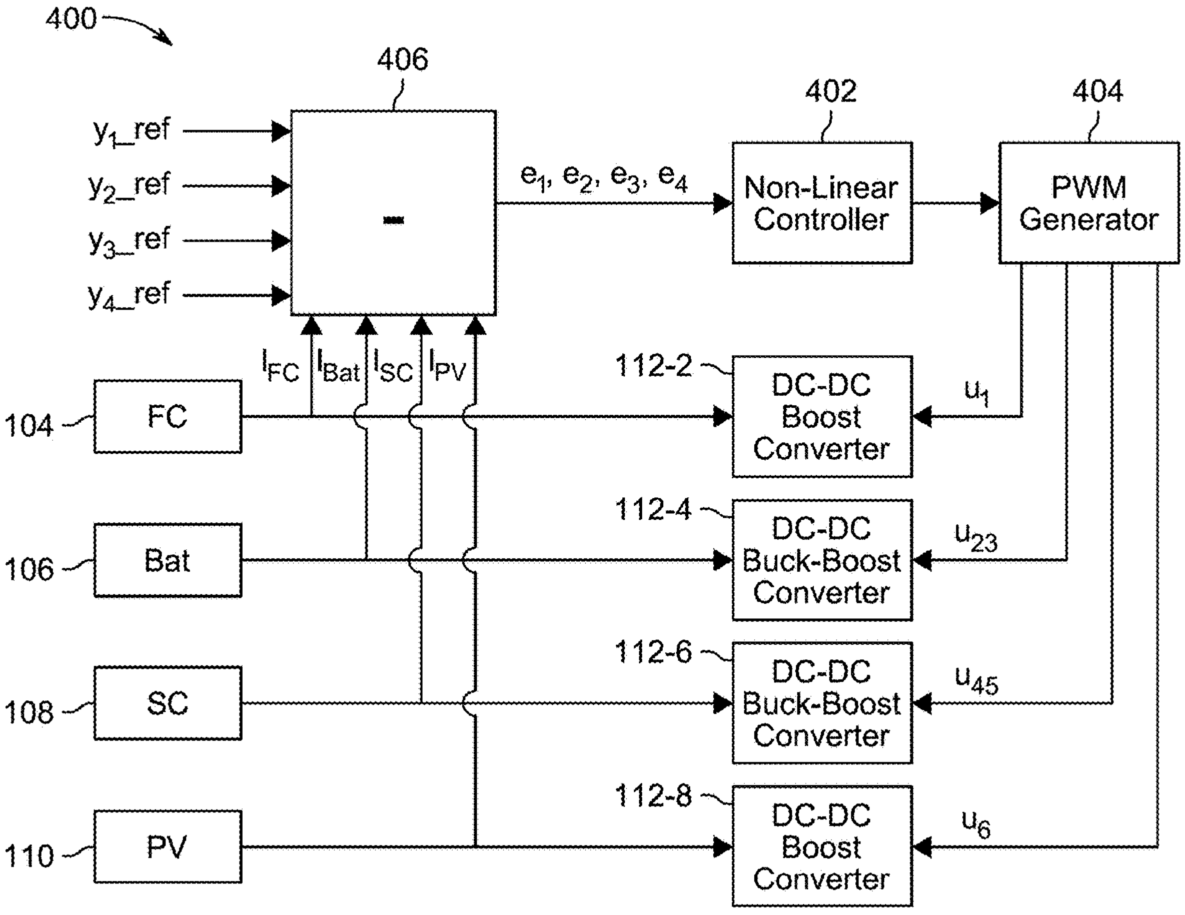
FIG. 4 is an exemplary diagram depicting converters control in a HEV, according to certain embodiments.

Referring now to FIG. 4, the present disclosure provides a diagram 400 depicting converters control in a HEV, according to certain embodiments. As depicted in the FIG. 4, the fuel cell 104 (represented as FC), the battery 106 (represented as Bat), the supercapacitor 108 (represented as SC), and the photovoltaic panel 110 (represented as PV) are connected to the DC-DC boost converter 112-2, the DC-DC buck-boost converter 112-4, the DC-DC buck-boost converter 112-6, and the DC-DC boost converter 112-8, respectively. Further, each converter is configured to receive inputs, i.e., '$u_1$', '$u_{23}$', '$u_{45}$', and '$u_6$' from a PWM generator 404. The PWM generator is configured to receive input '$e_1$', '$e_2$', '$e_3$', and '$e_4$' from a non-linear controller 402 that received this input generated using a negative feedback mechanism 406. Further, the negative feedback mechanism 406 receives '$y_{1ref}$', '$y_{2ref}$', '$y_{3ref}$', and '$y_{4ref}$'. In addition, the negative feedback mechanism 406 receives '$I_{fc}$', '$I_{bat}$', '$I_{sc}$', and '$I_{pv}$' from the fuel cell 104 (represented as FC), the battery 106 (represented as Bat), the supercapacitor 108 (represented as SC), and the photovoltaic panel (represented as PV). In an embodiment, the depicted controller control in the HEV provides an efficient, robust, and adaptive power management system (e.g., the control system 100) for the HEV.

Figure 5:
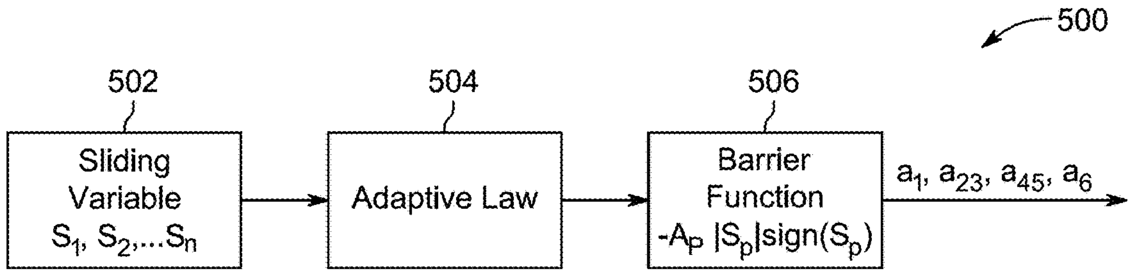
FIG. 5 is an exemplary diagram of a control block in a HEV, according to certain embodiments.

Referring now to FIG. 5, the present disclosure provides a diagram of a control block 500 in a HEV, according to certain embodiments. As depicted in the FIG. 5, the control block 500 includes sliding variables 502, e.g., '$S_1$', '$S_2$', . . . '$S_n$', an adaptive law module 504 (same as the adaptive law module 304), and a barrier function module 506 (same as the barrier function module 306), i.e., $-A_p|S_p|\text{sign}(S_p)$. The adaptive law module 504 is also referred to as the adaptive gain module. In an embodiment, the sliding variables 502 represents deviations or errors between an actual state of the control system 100 and a desired state. These sliding variables 502 are used to define the predefined sliding surface in the control system 100. These sliding variables 502 are used as inputs to both the adaptive law module 504 and the barrier function module 506 to adaptively adjust control signals in real-time. The adaptive law module 504 continuously adjusts control parameters, such as the gain values, to minimize errors in the behaviors of the control system 100 and to cope with disturbances or uncertainties that may arise during operation. The barrier function module 506 uses the barrier function that acts as a protective mechanism, enforcing constraints while allowing the control system 100 to adjust its behavior. When the control system 100 gets closer to violating any constraint, the barrier function adjusts the control signals to prevent constraint violations, ensuring safety and stability.

Figure 6A:
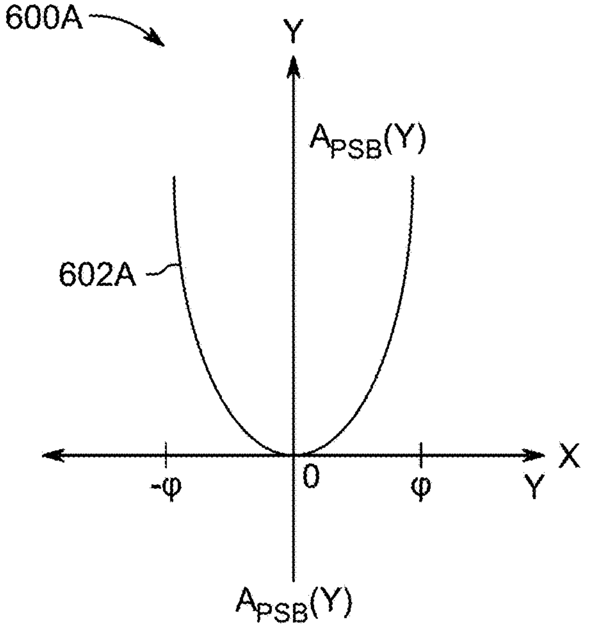
FIG. 6A is an exemplary diagram depicting a graphical representation of a barrier function, according to certain embodiments.

Referring now to FIG. 6A, the present disclosure provides a diagram depicting a graphical representation 600A of a barrier function, according to certain embodiments. In particular, the graphical representation 600A depicts the PSBF. In the graphical representation 600A, an X-axis represents a design parameter '$\phi$', that determines a proximity of the state of the control system 100 to its operational boundary. Further, Y-axis represents the barrier function, i.e., the PSBF for a state variable 'y'. Further, a U-shaped curve 602A in the graphical representation 600A depicts how the PSBF behaves as the state variable 'y' changes.

Figure 6B:
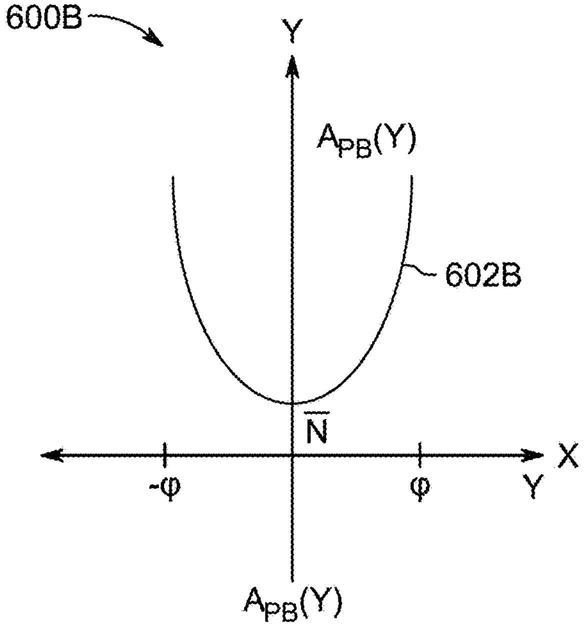
FIG. 6B is an exemplary diagram depicting another graphical representation of a barrier function, according to certain embodiments.

Referring now to FIG. 6B, the present disclosure provides a diagram depicting another graphical representation 600B of a barrier function, according to certain embodiments. In particular, the graphical representation 600B depicts the PSF. In the graphical representation 600A, an X-axis represents a design parameter '$\phi$', that determines a proximity of the state of the control system 100 to its operational boundary. Further, Y-axis represents the barrier function, i.e., the PSF for a state variable 'y'. Further, a U-shaped curve 602B in the graphical representation 600B depicts how the PSF behaves as the state variable 'y' changes.

Figure 7:
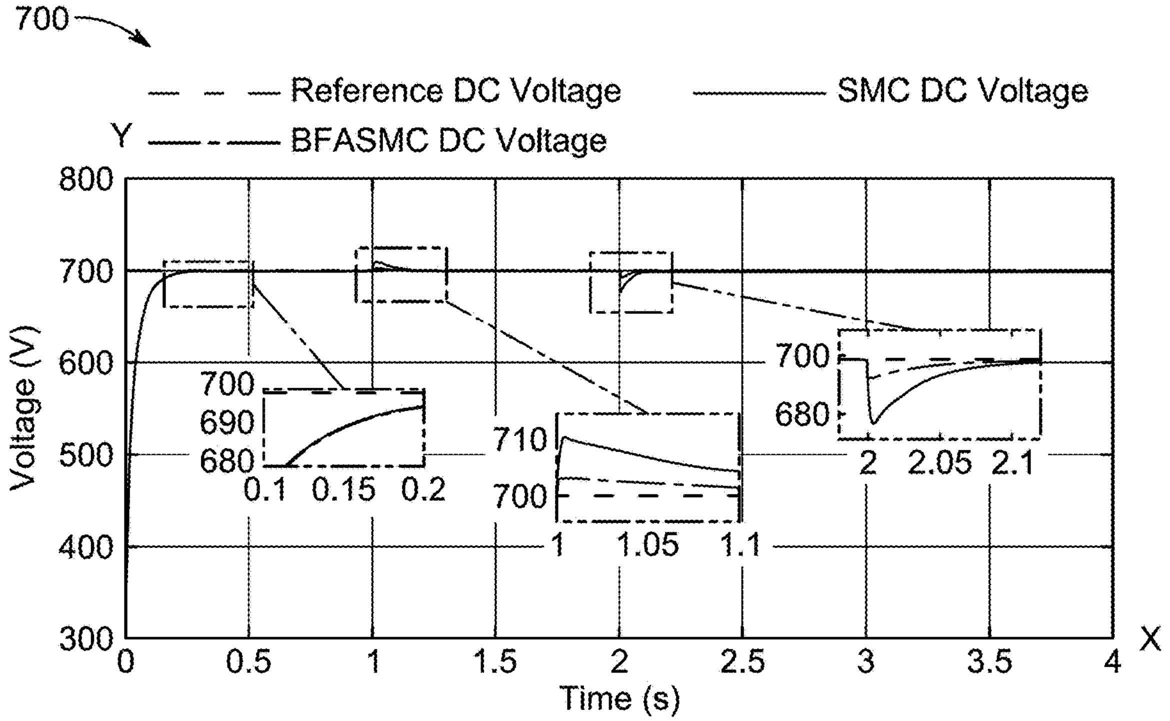
FIG. 7 is an exemplary diagram of a graph representing a direct current (DC) bus voltage regulation in a sliding mode controller (SMC) and a barrier function adaptive sliding mode controller (BFASMC), according to certain embodiments.

Referring now to FIG. 7, the present disclosure provides a diagram of a graph 700 representing the DC bus voltage regulation in the SMC and the BFASMC, according to certain embodiments. An X-axis represents a time (in seconds (s)) and a Y-axis represents a voltage (in Volts (V)). As depicted via the graph 700, peaks observed in the BFASMC are short-lived and have a lower amplitude compared to those seen in the SMC. The graph 700 provides comparative analysis indicating that the BFASMC outperforms the SMC, exhibiting less overshoot and negligible steady-state error. It is clear from the graph 700 that each energy source tracks its reference value effectively. The reference currents for the battery 106 and supercapacitor 108 are selected to represent both charging and discharging states. Further, the power balance equation, i.e., the equation (31) is utilized to generate a reference for the fuel cell 104. A photovoltaic panel current reference is obtained using a simulink model of the photovoltaic panel.

Further, a comparison of the ISE, the IAE, and the ITAE between the SMC and the BFASMC for the HESS is presented in a Table 6. The analysis reveals that BFASMC results has lower ISE, IAE, and ITAE compared to other traditional controllers. Additionally, a comprehensive comparative analysis of controllers is provided in the Table 6.

TABLE 6

| Control Strategy | Overshoot | Rise Time | Steady State Error |
|---|---|---|---|
| SMC. | 708.2 | 0.00819 | 0.19 |
| BFASMC. | 702.3 | 0.008152 | 0.04 |

In the Table 6, each row of a column 'control strategy' represents a name of a controller. Further, each row of a second column 'overshoot' represents values to which the control system's output exceeds its final steady-state value during transient response for a corresponding controller. Further, each row of a column 'rise time' represents values the time the corresponding controller takes for the control system output to rise from a certain lower percentage (e.g., 10%) to a higher percentage (e.g., 90%) of its final value. Further, each row of a column 'steady state error' represents a difference between the control system's output and the desired reference value once the control system 100 has settled and is no longer changing for the corresponding controller.

Figure 8:
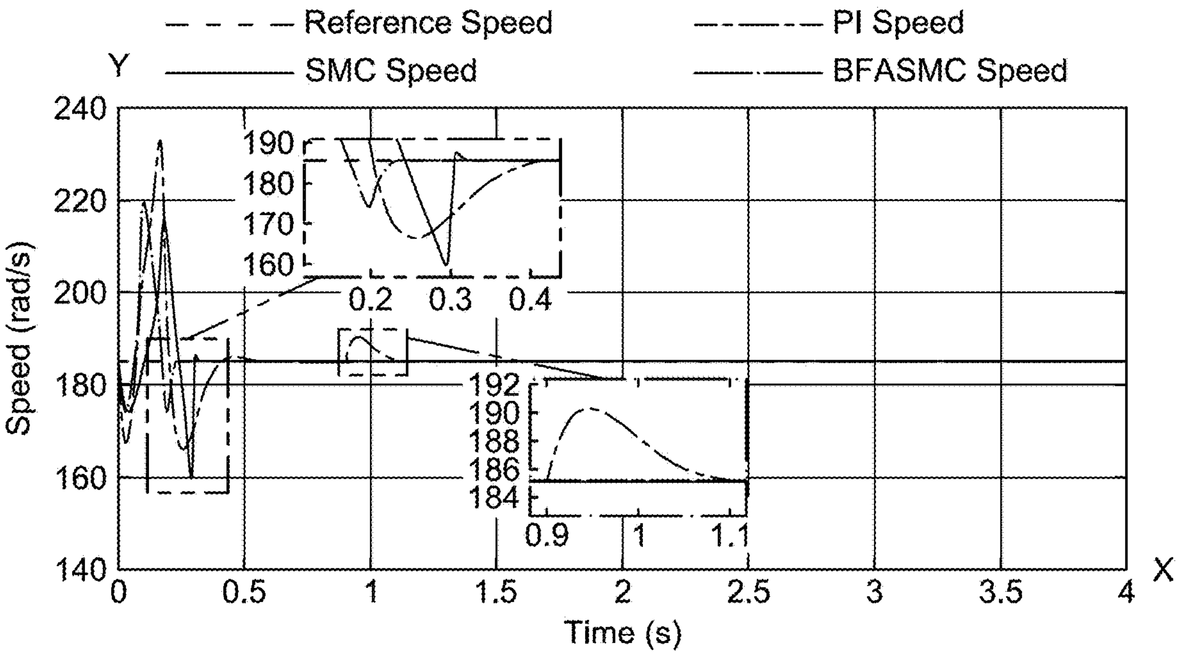
FIG. 8 is an exemplary diagram of a graph representing speed regulation using Proportional-Integral (PI) controller, a SMC, and a BFASMC, according to certain embodiments.

Referring now to FIG. 8, the present disclosure provides a diagram of a graph 800 representing speed regulation using the PI controller, the SMC, and the BFASMC, according to certain embodiments. In the graph 800, an X-axis represents a time (s), and a Y-axis represents a speed (rad/s). As depicted via the graph 800, each controller tracks the speed reference with high efficiency. It is evident from the graph 800 that among all the controllers, a magnitude of overshoots and undershoots for the BFASMC is smallest, thus providing the best performance. The load torque profile indicates a change in the load torque at 0.9 seconds. Following this transition, the speed of the induction motor 118, controlled by the PI controller, exhibits some variation. However, both the SMC and the BFASMC are able to handle the change in the load torque effectively by accurately tracking a target speed, as shown in the graph 800. Further, as depicted in the graph 800, the speed comparison highlights that the PI controller and the SMC exhibit higher steady-state errors, further demonstrating the superior performance of the BFASMC.

Figure 9:
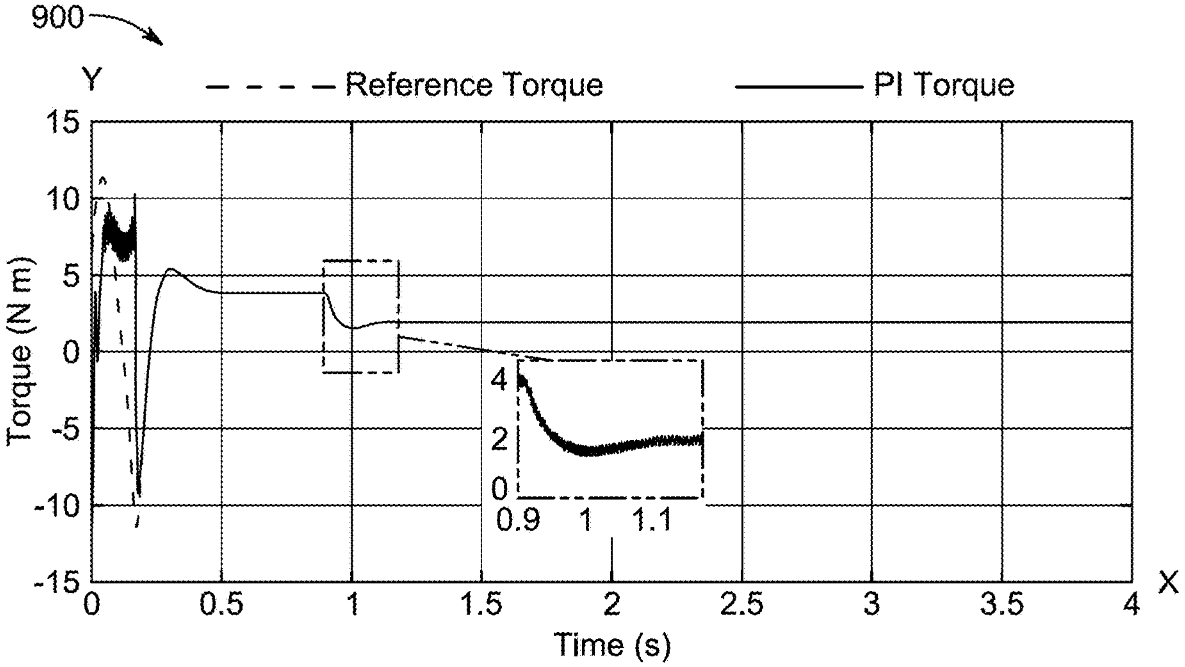
FIG. 9 is an exemplary diagram of a graph representing flux regulation using a PI controller, a SMC, and a BFASMC, according to certain embodiments.

Referring now to FIG. 9, the present disclosure provides a diagram of a graph 900 representing flux regulation using the PI controller, the SMC, and the BFASMC, according to certain embodiments. In the graph 900, an X-axis represents a time (s) associated with the flux regulation. Further, a Y-axis represents a torque (in Newton-meters (N m)) during the flux regulation during an associated time interval. As depicted in the graph 900, the performance of the BFASMC during the flux regulation tracking is exceptional. Further, spikes observed in the graph 900 are attributed to the PI controller and the SMC. However, the chattering effect in the flux regulation tracking is primarily associated with the SMC. In an embodiment, the control law for '$i_{sq}$' ensures that the speed of the HEV is tracked with high precision.

Figure 10:
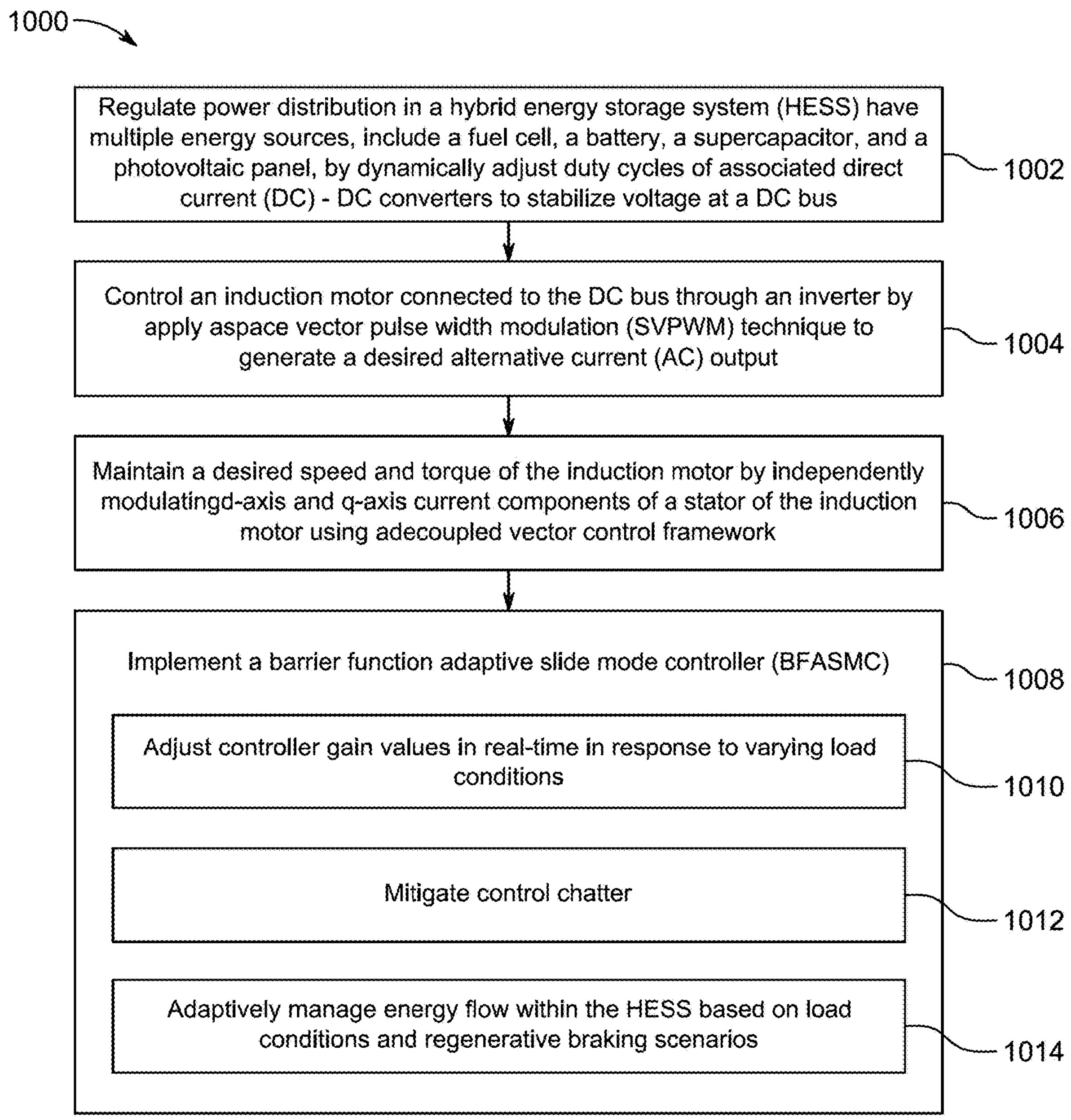
FIG. 10 is an exemplary diagram of a method for a hybrid electric vehicle (HEV), according to certain embodiments.

Referring now to FIG. 10, the present disclosure provides a diagram of a method 1000 for controlling the HEV, according to certain embodiments. The HEV is a vehicle that uses both the ICE and an electric motor to drive the vehicle, aiming to improve fuel efficiency and reduce emissions. In order to control the HEV, initially at step 1002, power distribution in the HESS having multiple energy sources is regulated. The multiple energy sources including a fuel cell (e.g., the fuel cell 104), the battery (i.e., the battery 106), the supercapacitor (i.e., the supercapacitor 108), and the photovoltaic panel (i.e., the photovoltaic panel 110).

The power distribution is the HESS having the multiple energy sources is regulated by dynamically adjusting duty cycles of associated DC-DC converters to stabilize voltage at a DC bus via an associated DC-DC converter. The associated DC-DC converter may correspond to the DC-DC boost converter 112-2, the DC-DC buck-boost converter 112-4, the DC-DC buck-boost converter 112-6, and the DC-DC boost converter 112-8. In an embodiment, the DC-DC boost converter 112-2, the DC-DC buck-boost converter 112-4, the DC-DC buck-boost converter 112-6, and the DC-DC boost converter 112-8 are collectively referred to as DC-DC converters 112. For example, the fuel cell 104 is connected to the DC bus 114 via the DC-DC boost converter 112-2. Similarly, the battery 106, the supercapacitor 108, and the PV 110 is connected to the DC bus 114 via the DC-DC buck-boost converter 112-4, the DC-DC buck-boost converter 112-6, and the DC-DC boost converter 112-8, respectively.

In an embodiment, the DC-DC boost converter (e.g., the DC-DC boost converter 112-2 or the DC-DC boost converter 112-8) is a power converter that is used to increase an input voltage to a higher output voltage, maintaining the same polarity. The DC-DC boost converter is used when the input voltage needs to be boosted to the higher value, such as when powering devices requiring the higher voltage from the lower voltage source. Further, the DC-DC buck-boost converter (e.g., the DC-DC buck-boost converter 112-4 and the DC-DC buck-boost converter 112-6) is the versatile power converter that is used to increase or decrease the input voltage, providing the desired output voltage regardless of whether the input voltage is higher or lower than the desired output voltage.

In order to regulate the power distribution, energy source parameters, including state of charge (SoC), voltage, and current of the fuel cell, the battery, the supercapacitor, and the photovoltaic panel are monitored. In an embodiment, the energy source parameters include fuel Cell parameters, battery parameters, supercapacitor parameters, and photovoltaic panel parameters. The fuel cell parameters include, for example, an operating voltage and current levels of the fuel cell, an internal temperature of the fuel cell that affects performance. The battery parameters include, for example, the SoC, which is a current energy level of the battery as a percentage of its maximum capacity, and voltage and current during charging and discharging cycles. The supercapacitor parameters include, for example, capacitance, voltage limits and charge/discharge rates, and energy density, which determines the supercapacitor's ability to store energy quickly. The photovoltaic panel parameters include, for example, Irradiance, which is a solar energy incident on the photovoltaic panel surface, a temperature of an environment in which the photovoltaic panel is installed, and a power output, which is maximum output power under standard test conditions.

Further, based on the monitoring, the duty cycles of the DC-DC converters are adjusted to stabilize the voltage at the DC bus under varying load conditions. Upon adjusting the duty cycles, the high-frequency oscillations are minimized in the control signals by employing barrier functions to reduce the chattering effects. In an embodiment, the control signal refers to a set of signals generated by a controller (i.e., the BFASMC) to influence the control system 100 and guide the control system 100 toward the desired state. In the control system 100 for the HEV, the control signals are divided into two categories, i.e., energy source control signals and motor control signals. The energy source control signals include the duty cycles for the DC-DC converters connected to the HESS. The motor control signals consist of the d-axis current component, which controls the magnetic flux, and the q-axis current component, which controls the torque. Additionally, switching signals for an inverter (e.g., the inverter 116) are generated via SVPWM technique to manage the operations of an induction motor (e.g., the induction motor 118). In an embodiment, the chattering effect refers to rapid, oscillatory behavior or instability in the control system 100.

Further, at step 1004, the induction motor that is connected to the DC bus is controlled through the inverter by applying the SVPWM technique to generate the desired AC output. Once the induction motor is controlled, at step 1006, the desired speed and the torque of the induction motor is maintained by independently modulating the d-axis and q-axis current components of the stator of the induction motor using the decoupled vector control framework. In an embodiment, to maintain the desired speed and torque of the induction motor, the d-axis and q-axis current components of the stator are regulated by implementing the IVC. Once the d-axis and q-axis current components of the stator are regulated, feedback received from stator current measurements is used to control torque via the q-axis current component and the magnetic flux via the d-axis current component. Further, control signals (i.e., the switching signals) corresponding to the induction motor are dynamically adjusted to respond to reference speed and torque values under varying load conditions.

Once the desired speed and torque of the induction motor are maintained, at step 1008, the BFASMC is implemented. The BFASMC is implemented to adjust controller gain values in real-time in response to varying load conditions, as mentioned via step 1010. Further, the BFASMC is implemented to mitigate control chattering, as mentioned via step 1012. In addition, the BFASMC is implemented to adaptively manage energy flow within the HESS based on load conditions and regenerative braking scenarios, as mentioned via step 1014. In an embodiment, the implementation of the BFASMC includes generation of the PBF and the PSBF to modulate a control signal dynamically, and adjusting the magnitude of the control signal based on a proximity of the system state to the predefined sliding surface, thereby minimizing high-frequency oscillations in the control signal near the predefined sliding surface. The predefined sliding surface is a predefined trajectory or condition the system state must follow or achieve. The predefined sliding surface is where a system behavior (i.e., the behavior of the control system 100) is stable and meets desired operational criteria. In an embodiment, to adjust the magnitude of the control signal, the d-axis and q-axis current components of the induction motor are modulated based on the proximity of the system state to the predefined sliding surface.

The system state refers to the current values of all variables that describe the system's dynamic behavior at any given moment. The system state includes energy source states, motor states, and system wide states. The energy source states include the voltages and the currents of the HESS, along with the SoC and a state of health (SoH) for the battery and the supercapacitor. For the motor state includes the speed and torque of the induction motor, as well as the d-axis and q-axis current components used for vector control. Additionally, the system-wide states are tracked, including the DC bus voltage and the load torque on the induction motor. These system states are continuously monitored to detect any deviations from the desired operational point or reference, ensuring optimal performance of the system (i.e., the control system 100).

In an embodiment, the implementation of the BFASMC further includes applying the Lyapunov stability criterion to ensure global asymptotic stability of the HEV under varying load conditions. The Lyapunov stability criteria is a method for determining the stability of the control system 100 without solving a differential equation. The Lyapunov stability criteria is based on the idea that a stable system dissipates energy.

The present disclosure pertains to a control system (e.g., the control system 100) for an HEV including a three-phase induction motor (e.g., the induction motor 118) and four distinct energy sources, i.e., a fuel cell, a battery, a supercapacitor, and a photovoltaic panel. These energy sources are essential for meeting the load demands of the HEV at varying voltage levels, which are influenced by the vehicle's diverse speed profiles. To ensure a smooth and comfortable driving experience, regulating the required DC bus voltage is crucial.

A concept of field orientation, introduced by F. Blaschke in 1972, enables characteristics similar to those of a DC motor in the induction motor by implementing a decoupled control strategy that separately manages torque and flux within the induction motor. This method is referred to as vector control (VC). In the VC method, the stator current components along the d-axis and q-axis current components are independently controlled. The q-axis current component manages the torque, while the d-axis current component controls the flux linkage. The VC method can be classified into two categories, a Direct Vector Control (DVC) and the IVC. The IVC offers several advantages, including decoupled control of torque and flux, superior dynamic behavior, and full motor torque capability even at low speeds.

In the VC method, motor speed is determined based on the measurement of stator voltages and currents. Traditionally, PI controllers have been widely used for variable speed operation. However, due to the nonlinear nature of induction motors, the PI controllers are limited in providing optimal performance. Additionally, fixed-gain controllers are highly sensitive to parameter variations, load disturbances, and external factors. To address these issues, intelligent controller, such as the SMC and the BFASMC, are proposed for sensor less vector control in HEVs.

HEV mathematical models exhibit complex, dynamic, and nonlinear characteristics, making nonlinear controllers more suitable than their linear counterparts. Nonlinear controllers, such as the SMC and the BFASMC, are capable of effectively addressing the inherent non-linearities and uncertainties present in the system. This present disclosure proposes the application of the SMC and the BFASMC for the HESS to enhance the performance of the control system. The SMC offers several advantages over other nonlinear controllers, including robustness and the ability to achieve finite-time convergence. The BFASMC not only mitigates the chattering effect associated with traditional SMC but also enhances the gain selection process. While the SMC effectively cancels nonlinearities, parameter uncertainties, and external disturbances using feedback input with high gain, the issue of chattering arises due to the discontinuous nature of the control action. The BFASMC addresses this challenge by smoothing the control actions and improving gain adaptation.

In particular, the present disclosure provides a novel topology (i.e., the control system 100) for the HEV aimed at optimizing performance and reliability across varying load conditions. The present disclosure integrates the HESS, the DC-DC converters, and the induction motor along with a power source to enable effective power regulation. Further, the BFASMC is introduced to ensure robust system operation and asymptotic stability despite high parameter variations. The BFASMC is designed to regulate both the output voltage of the HESS and the speed of the induction motor, ensuring that current sources track their reference values efficiently. The present disclosure also employs a Lyapunov's stability method to guarantee asymptotic stability of the control system 100. Further, the present disclosure demonstrates the performance of the BFASMC is compared to two conventional controllers, the PI controller and the SMC, through simulations conducted in MATLAB/Simulink method. The simulation results demonstrate that the BFASMC offers superior performance compared to both the PI controller and the SMC. Furthermore, the HIL testing confirms the efficiency and stability of the BFASMC. The HIL testing is a simulation technique that integrates real hardware components with a virtual system model to test and validate control strategies in real-time. The HIL testing allows for the evaluation of the control system's performance under actual operating conditions without requiring full-scale physical prototypes.

Figure 11:
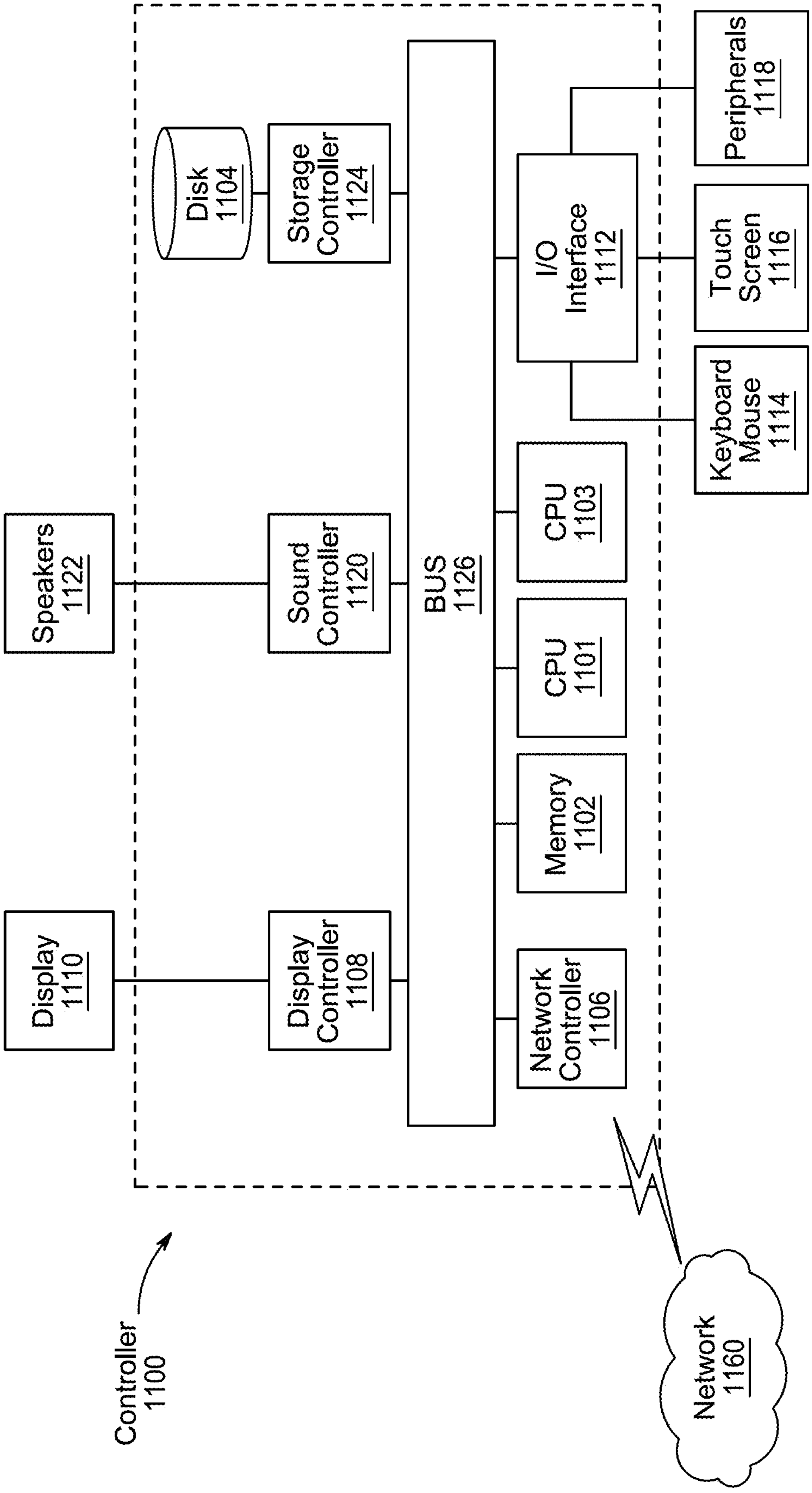
FIG. 11 is an illustration of a non-limiting example of details of computing hardware used in the computing device, according to certain embodiments.

Next, further details of the hardware description of the computing environment according to exemplary embodiments is described with reference to FIG. 11. In FIG. 11, a controller 1100 is described as representative of energy management unit and controller 102 in which the controller 1100 is a computing device which includes a Central Processing Unit (CPU) 1101 which performs the processes described above/below. The process data and instructions may be stored in a memory 1102. These processes and instructions may also be stored on a storage medium disk 1104 such as a Hard Disk Drive (HDD) or a portable storage medium or may be stored remotely.

Further, the claims are not limited by the form of the computer-readable media on which the instructions of the inventive process are stored. For example, the instructions may be stored on Compact Disks (CDs), Digital Versatile Discs (DVDs), in a Flash memory, a Random Access Memory (RAM), a Read-Only Memory (ROM), a Programmable Read-Only Memory (PROM), an Erasable Programmable Read-Only Memory (EPROM), an Electrically Erasable Programmable Read-Only Memory (EEPROM), a hard disk or any other information processing device with which the computing device communicates, such as a server or a computer.

Further, the claims may be provided as a utility application, background daemon, or component of an operating system, or combination thereof, executing in conjunction with the CPU 1101, a CPU 1103 and an operating system such as a Microsoft Windows 7, a Microsoft Windows 10, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 1101 or the CPU 1103 may be a Xenon or a Core processor from Intel of America or an Opteron processor from Advanced Micro Devices (AMD) of America, or may be other processor types that would be recognized by one of ordinary skill in the art. Alternatively, the CPU 1101, the CPU 1103 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. Further, the CPU 1101, the CPU 1103 may be implemented as multiple processors cooperatively working in parallel to perform the instructions of the inventive processes described above.

The computing device in FIG. 11 also includes a network controller 1106, such as an Intel Ethernet Professional (PRO) network interface card from an Intel Corporation of America, for interfacing with a network 1160. As can be appreciated, the network 1160 can be a public network, such as the Internet, or a private network such as a Local Area Network (LAN) or a Wide Area Network (WAN), or any combination thereof and can also include a Public Switched Telephone Network (PSTN) or an Integrated Services Digital Network (ISDN) sub-networks. The network 1160 can also be wired, such as an Ethernet network, or can be wireless such as a cellular network including EDGE, Third Generation (3G) and Fourth Generation (4G) wireless cellular systems. The wireless network can also be a WiFi, a Bluetooth, or any other wireless form of communication that is known.

The computing device further includes a display controller 1108, such as a NVIDIA GeForce Giga Texel Shader eXtreme (GTX) or a Quadro graphics adaptor from a NVIDIA Corporation of America for interfacing with a display 1110, such as a Hewlett Packard HPL2445w Liquid Crystal Display (LCD) monitor. A general purpose I/O interface 1112 interfaces with a keyboard and/or mouse 1114 as well as a touch screen panel 1116 on or separate from display 1110. The general purpose I/O interface 1112 also connects to a variety of peripherals 1118 including printers and scanners, such as an OfficeJet or DeskJet from HP.

A sound controller 1120 is also provided in the computing device such as a Sound Blaster X-Fi Titanium from Creative, to interface with speakers/microphone 1122 thereby providing sounds and/or music.

A general-purpose storage controller 1124 connects the storage medium disk 1104 with a communication bus 1126, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 1110, keyboard and/or mouse 1114, as well as the display controller 1108, the general purpose storage controller 1124, the network controller 1106, the sound controller 1120, and the general purpose I/O interface 1112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 12.

Figure 12:
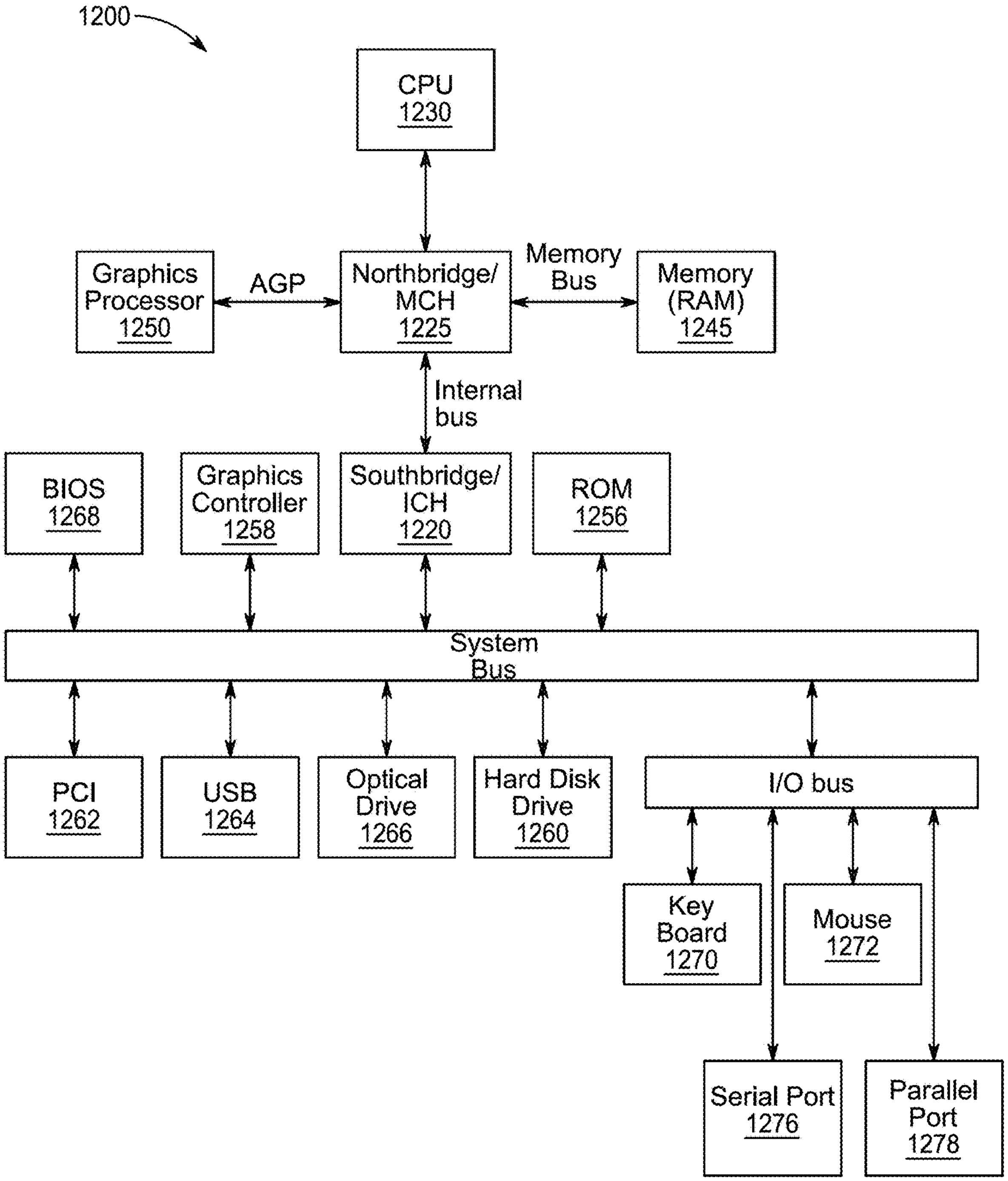
FIG. 12 is an exemplary schematic diagram of a data processing system used within the computing device, according to certain embodiments.

FIG. 12 shows a schematic diagram of a data processing system 1200, according to certain embodiments, for performing the functions of the exemplary embodiments. The data processing system 1200 is an example of a computer in which code or instructions implementing the processes of the illustrative embodiments may be located.

In FIG. 12, the data processing system 1200 employs a hub architecture including a North Bridge and a Memory Controller Hub (NB/MCH) 1225 and a south bridge and an Input/Output (I/O) Controller Hub (SB/ICH) 1220. The CPU 1230 is connected to the NB/MCH 1225. The NB/MCH 1225 also connects to a memory 1245 via a memory bus and connects to a graphics processor 1250 via an Accelerated Graphics Port (AGP). The NB/MCH 1225 also connects to the SB/ICH 1220 via an internal bus (e.g., a unified media interface or a direct media interface). The CPU 1230 may contain one or more processors and even may be implemented using one or more heterogeneous processor systems.

Figure 13:
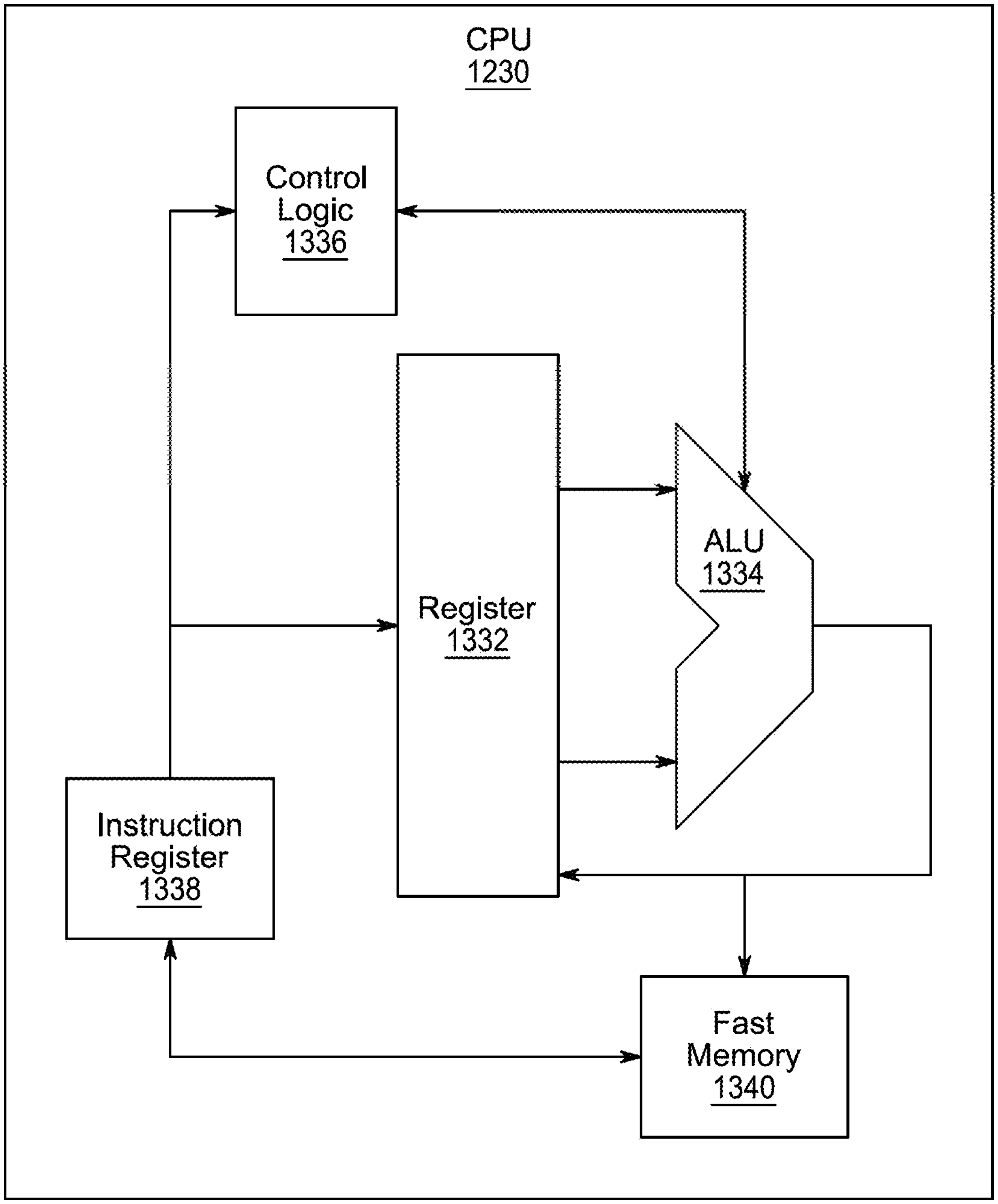
FIG. 13 is an exemplary schematic diagram of a processor used with the computing device, according to certain embodiments.

For example, FIG. 13 shows one implementation of the CPU 1230. In one implementation, an instruction register 1338 retrieves instructions from a fast memory 1340. At least part of these instructions is fetched from the instruction register 1338 by a control logic 1336 and interpreted according to the instruction set architecture of the CPU 1330. Part of the instructions can also be directed to a register 1332. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 1334 that loads values from the register 1332 and performs logical and mathematical operations on the loaded values according to the instructions. The results from these operations can be feedback into the register 1332 and/or stored in the fast memory 1340. According to certain implementations, the instruction set architecture of the CPU 1230 can use a reduced instruction set architecture, a complex instruction set architecture, a vector processor architecture, a very large instruction word architecture. Furthermore, the CPU 1230 can be based on a Von Neuman model or a Harvard model. The CPU 1230 can be a digital signal processor, a Field-Programmable Gate Array (FPGA), an Application-Specific Integrated Circuit (ASIC), a Programmable Logic Array (PLA), a Programmable Logic Device (PLD), or a Complex Programmable Logic Device (CPLD). Further, the CPU 1230 can be an x86 processor by the Intel or by the AMD; an Advanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 12, the data processing system 1200 can include that the SB/ICH 1220 is coupled through a system bus to an I/O Bus, a ROM 1256, a Universal Serial Bus (USB) port 1264, a flash Binary Input/Output System (BIOS) 1268, and a graphics controller 1258. Peripheral Component Interconnect/Peripheral Component Interconnect Express (PCI/PCIe) devices can also be coupled to SB/ICH 1220 through a PCI bus 1262.

The PCI devices may include, for example, Ethernet adapters, add-in cards, and Personal Computer (PC) cards for notebook computers. The HDD 1260 and an optical drive 1266 (e.g., CD-ROM) can use, for example, an Integrated Drive Electronics (IDE) or a Serial Advanced Technology Attachment (SATA) interface. In one implementation, an I/O bus can include a super I/O (SIO) device.

Further, the HDD 1260 and the optical drive 1266 can also be coupled to the SB/ICH 1220 through a system bus. In one implementation, a keyboard 1270, a mouse 1272, a serial port 1276, and a parallel port 1278 can be connected to the system bus through the I/O bus. Other peripherals and devices that can be connected to the SB/ICH 1220 using a mass storage controller such as the SATA or a Parallel Advanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 14:
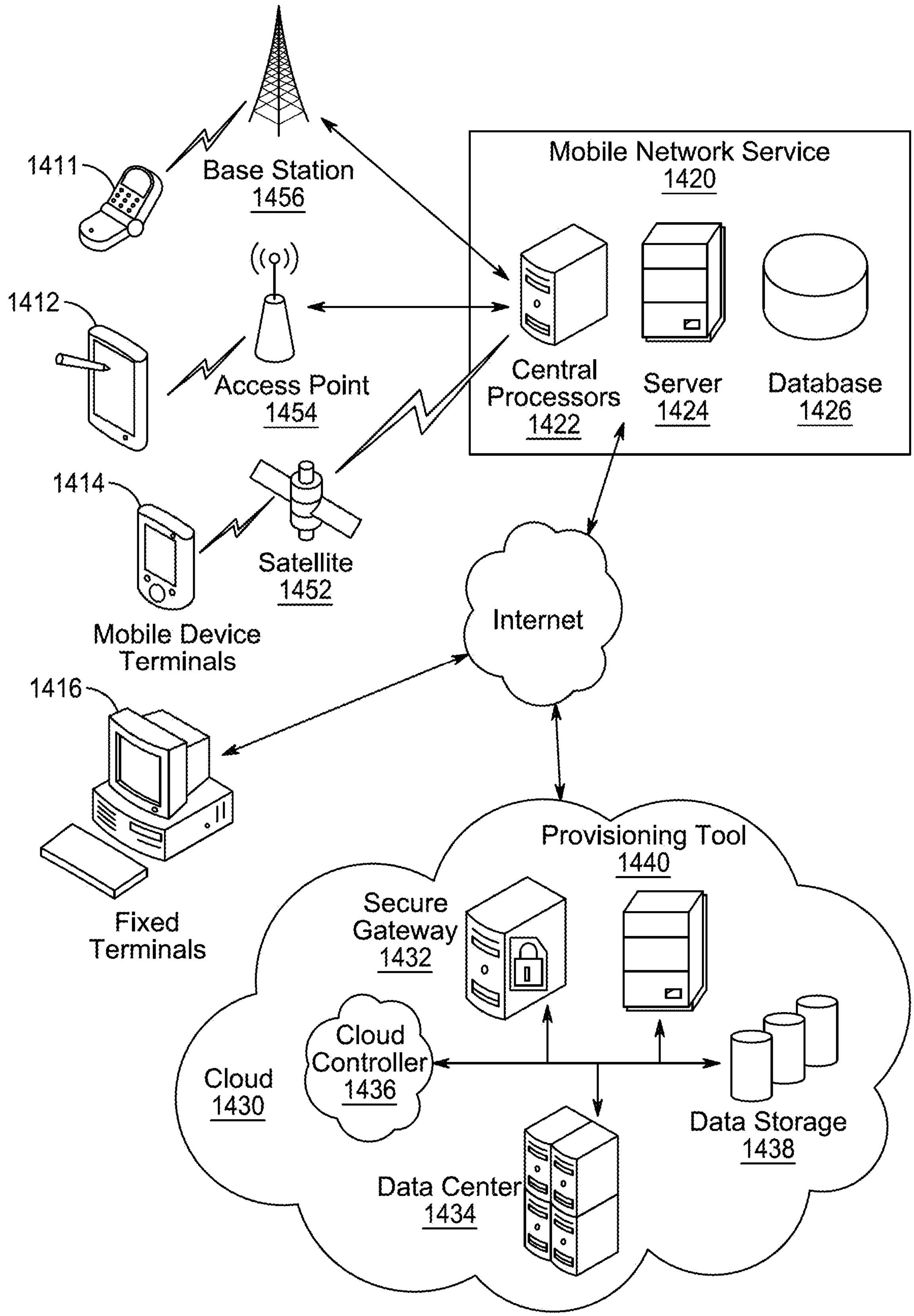
FIG. 14 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 14, in addition to various human interface and communication devices (e.g., display monitors, smart phones, tablets, personal digital assistants (PDAs)). More specifically, FIG. 14 illustrates client devices including a smart phone 1411, a tablet 1412, a mobile device terminal 1414 and fixed terminals 1416. These client devices may be commutatively coupled with a mobile network service 1420 via a base station 1456, an access point 1454, a satellite 1452 or via an internet connection. The mobile network service 1420 may comprise central processors 1422, a server 1424 and a database 1426. The fixed terminals 1416 and the mobile network service 1420 may be commutatively coupled via an internet connection to functions in cloud 1430 that may comprise a security gateway 1432, a data center 1434, a cloud controller 1436, a data storage 1438 and a provisioning tool 1440. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A control system for a hybrid electric vehicle (HEV) comprising:
- a hybrid energy storage system (HESS) having multiple energy sources including a fuel cell, a battery, a supercapacitor, and a photovoltaic panel, wherein each energy source is connected to a direct current (DC) bus through DC-DC converters;
- an induction motor operatively connected to the DC bus through an inverter configured to generate a desired alternative current (AC) output for an induction motor control, wherein the inverter is controlled by a space vector pulse width modulation (SVPWM) technique; and
- a barrier function adaptive sliding mode controller (BFASMC) configured to:
  - regulate power distribution among the multiple energy sources of the HESS by dynamically adjusting duty cycles of the DC-DC converters to achieve voltage stability at the DC bus,
  - maintain a desired speed and torque of the induction motor by controlling induction motor current components in a decoupled vector control framework, wherein the BFASMC modulates d-axis and q-axis current components of a stator of the induction motor, and
  - adaptively adjust controller gain values in response to real-time load variations of the HEV to reduce control chattering and increase control precision.

2. The control system of claim 1, wherein the BFASMC includes:
- a barrier function module that is configured to dynamically modulate control signals as a system state approaches a predefined sliding surface, reducing chattering effects in the control signals; and
- an adaptive gain module that continuously adjusts the controller gain values based on variations in HEV load and energy source parameters to control both the HESS and the induction motor.

3. The control system of claim 2, wherein the barrier function module includes a positive definite barrier function (PBF) and a positive semi-definite barrier function (PSBF), each configured to adaptively adjust a magnitude of the control signal based on a proximity of the system state to the predefined sliding surface, thereby minimizing oscillations in the control signals near the predefined sliding surface.

4. The control system of claim 1, wherein the induction motor is controlled via an indirect vector control (IVC) that uses feedback from stator current measurements to regulate the d-axis and q-axis current components, wherein the q-axis current component is controlled for torque and the d-axis current component for magnetic flux, achieving decoupled control under dynamic driving conditions.

5. The control system of claim 1, wherein the BFASMC adaptively manages energy flow within the HESS by:
- directing energy from the fuel cell and the battery during high-load conditions;
- enabling energy recovery in the supercapacitor and the battery during regenerative braking; and
- using photovoltaic power to charge the battery and the supercapacitor under low-load conditions.

6. The control system of claim 1, wherein the BFASMC is configured to employ a Lyapunov stability criterion to ensure global asymptotic stability of the control system under varying load conditions, achieving finite-time convergence of system states to a predefined sliding surface.

7. A control system for a hybrid electric vehicle (HEV) comprising:
- a hybrid energy storage system (HESS) having multiple energy sources including a fuel cell, a battery, a supercapacitor, and a photovoltaic panel, wherein each energy source is connected to a DC bus through DC-DC converters, and wherein the DC bus is configured to regulate and distribute power to an induction motor and auxiliary systems of the HEV;
- an inverter and the induction motor, wherein the inverter is configured to convert DC power from the DC bus to alternative current (AC) power for driving the induction motor; and
- a controller configured to implement a barrier function adaptive sliding mode control (BFASMC) algorithm, wherein the controller is operatively connected to the DC-DC converters, the inverter, and the induction motor, and wherein the controller is further configured to:
  - regulate power distribution among the multiple energy sources of the HESS by dynamically adjusting duty cycles of the DC-DC converters to achieve voltage stability at the DC bus,
  - maintain desired speed and torque of the induction motor by controlling induction motor current components in a decoupled vector control framework, wherein the controller modulates d-axis and q-axis current components of a stator of the induction motor, adaptively adjust controller gain values in response to real-time load variations of the HEV to reduce control chattering and increase control precision, and regulate DC bus voltage and motor speed using a control law derived from a Lyapunov stability criterion to ensure global asymptotic stability of the HEV.

8. The control system of claim 7, wherein the controller is configured to dynamically modulate a control signal as a system state approaches a predefined sliding surface, reducing chattering effects in the control signal.

9. The control system of claim 8, wherein the controller includes a positive definite barrier function (PBF) and a positive semi-definite barrier function (PSBF), each configured to adaptively adjust a magnitude of the control signal based on a proximity of the system state to the predefined sliding surface, thereby minimizing oscillations in the control signal near the predefined sliding surface.

10. The control system of claim 9, wherein the PBF ensures that error variables are driven to zero within a finite time, independent of bounded disturbances.

11. The control system of claim 9, wherein the PSBF stabilizes the system state by ensuring error variables converge to a predefined neighborhood of zero without exceeding safety-critical constraints.

12. The control system of claim 7, wherein the controller is configured to continuously adjust the controller gain values based on variations in HEV load and energy source parameters to control both the HESS and the induction motor.

13. The control system of claim 7, wherein the controller defines sliding surfaces for error variables corresponding to: (a) current of each energy source in the HESS, (b) DC bus voltage, and (c) speed, torque, and flux of the induction motor.

14. The control system of claim 7, wherein the HESS includes (a) a boost converter for the fuel cell and the photovoltaic panel to step up voltage of the fuel cell and the photovoltaic panel to match DC bus voltage, and (b) bidirectional buck-boost converters for the battery and the supercapacitor to enable both charging and discharging operations.

15. A method of controlling a hybrid electric vehicle (HEV), the method comprising:

regulating power distribution in a hybrid energy storage system (HESS) having multiple energy sources, including a fuel cell, a battery, a supercapacitor, and a photovoltaic panel, by dynamically adjusting duty cycles of associated direct current (DC)-DC converters to stabilize voltage at a DC bus;

controlling an induction motor connected to the DC bus through an inverter by applying a space vector pulse width modulation (SVPWM) technique to generate a desired alternative current (AC) output;

maintaining a desired speed and torque of the induction motor by independently modulating d-axis and q-axis current components of a stator of the induction motor using a decoupled vector control framework; and implementing a barrier function adaptive sliding mode controller (BFASMC) to:

adjust controller gain values in real-time in response to varying load conditions, mitigate control chattering, and adaptively manage energy flow within the HESS based on load conditions and regenerative braking scenarios.

16. The method of claim 15, wherein implementing the BFASMC includes:

generating a positive definite barrier function (PBF) and a positive semi-definite barrier function (PSBF) to modulate a control signal dynamically, and adjusting a magnitude of the control signal based on a proximity of system state to a predefined sliding surface, thereby minimizing high-frequency oscillations in the control signal near the predefined sliding surface.

17. The method of claim 16, wherein adjusting the magnitude of the control signal includes:

modulating the d-axis and q-axis current components of the induction motor based on the proximity of the system state to the predefined sliding surface.

18. The method of claim 15, wherein implementing the BFASMC further includes:

applying a Lyapunov stability criterion to ensure global asymptotic stability of the HEV under varying load conditions.

19. The method of claim 15, wherein maintaining the desired speed and torque of the induction motor further includes:

regulating the d-axis and q-axis current components of the stator by implementing indirect vector control;

using feedback from stator current measurements to control torque via the q-axis current component and magnetic flux via the d-axis current component; and dynamically adjusting control signals corresponding to the induction motor to respond to reference speed and torque values under varying load conditions.

20. The method of claim 15, wherein regulating power distribution further includes:

monitoring energy source parameters, including state of charge (SoC), voltage, and current of the fuel cell, the battery, the supercapacitor, and the photovoltaic panel;

adjusting the duty cycles of the DC-DC converters to stabilize the voltage at the DC bus under varying load conditions; and minimizing high-frequency oscillations in control signals by employing barrier functions to reduce the chattering.

* * * * *